US012251019B2

(12) United States Patent
Cho et al.

(10) Patent No.: US 12,251,019 B2
(45) Date of Patent: Mar. 18, 2025

(54) CLEARANCE ADJUSTMENT MEMBER AND FIXING APPARATUS HAVING THE SAME

(71) Applicant: LG Display Co., Ltd., Seoul (KR)

(72) Inventors: Hyuncheol Cho, Paju-si (KR); Euijung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 161 days.

(21) Appl. No.: 18/072,210

(22) Filed: Nov. 30, 2022

(65) Prior Publication Data

US 2023/0210262 A1 Jul. 6, 2023

(30) Foreign Application Priority Data

Dec. 31, 2021 (KR) ........................ 10-2021-0193658

(51) Int. Cl.
*A47B 97/00* (2006.01)
*F16B 1/00* (2006.01)

(52) U.S. Cl.
CPC .............. *A47B 97/001* (2013.01); *F16B 1/00* (2013.01); *F16B 2200/83* (2023.08)

(58) Field of Classification Search
CPC ...... A47B 97/001; F16M 11/00; F16M 11/04; F16M 11/048; F16B 2200/83; F16B 1/00; F16B 23/0023
See application file for complete search history.

(56) References Cited

U.S. PATENT DOCUMENTS

| | | | | |
|---|---|---|---|---|
| 7,508,476 | B2 * | 3/2009 | Huang | G02F 1/1393 349/129 |
| 9,752,601 | B2 * | 9/2017 | Giacalone | B64C 1/066 |
| 10,653,021 | B2 * | 5/2020 | Kim | G09F 9/3026 |
| 10,655,656 | B2 * | 5/2020 | Franklin | H01R 13/73 |
| 11,184,986 | B2 * | 11/2021 | Heo | H05K 5/0008 |
| 11,259,425 | B2 | 2/2022 | Kim | |

(Continued)

FOREIGN PATENT DOCUMENTS

| | | | |
|---|---|---|---|
| CN | 104162715 | A | 11/2014 |
| CN | 209452422 | U | 10/2019 |

(Continued)

OTHER PUBLICATIONS

Intellectual Property Office of the United Kingdom, Combined Search and Examination Report, United Kingdom Patent Application No. GB2218622.5, Jun. 27, 2023, five pages.

(Continued)

*Primary Examiner* — Monica E Millner
(74) *Attorney, Agent, or Firm* — Fenwick & West LLP

(57) ABSTRACT

A clearance adjustment member and a fixing apparatus including the same is disclosed. The clearance adjustment member including: a magnetic force including a through hole, the magnetic force unit configured to be attached to a bracket that is mounted on a wall; a screw beam disposed in the through hole of the magnetic force unit; and an adjustment unit connected to the screw beam, the adjustment unit configured to move along the screw beam to adjust a clearance between the wall and a display device that is to be connected to the adjustment unit. According to the present disclosure, it is possible to adjust the clearance between the wall and the display device simply and precisely.

20 Claims, 33 Drawing Sheets

(56) References Cited

U.S. PATENT DOCUMENTS

| | | | | |
|---|---|---|---|---|
| 11,698,167 | B2 * | 7/2023 | Kim | G06F 1/1607 361/679.02 |
| 12,078,285 | B2 * | 9/2024 | Choi | F16M 11/046 |
| 2013/0034406 | A1 * | 2/2013 | Wu | F16B 5/0241 411/396 |
| 2013/0168519 | A1 | 7/2013 | In et al. | |
| 2015/0234117 | A1 | 8/2015 | Kamada | |
| 2020/0126456 | A1 * | 4/2020 | Davison | G09F 7/04 |
| 2020/0205305 | A1 * | 6/2020 | Kim | H05K 5/0017 |
| 2020/0245488 | A1 | 7/2020 | Iacovoni et al. | |
| 2021/0080053 | A1 | 3/2021 | Kim | |

FOREIGN PATENT DOCUMENTS

| | | | |
|---|---|---|---|
| CN | 211399170 | U | 9/2020 |
| CN | 211551087 | U | 9/2020 |
| CN | 112270896 | A | 1/2021 |
| JP | 2013-141197 | A | 7/2013 |
| KR | 10-2011-0012922 | A | 2/2011 |
| KR | 10-2015-0073293 | A | 7/2015 |
| KR | 10-2020-0076384 | A | 6/2020 |
| TW | 200505594 | A | 2/2005 |

OTHER PUBLICATIONS

Taiwan Intellectual Property Office, Notice of Allowance, Taiwanese Patent Application No. 111146982, May 4, 2023, 11 pages.

The Japan Patent Office, Office Action, Japanese Patent Application No. 2022-194573, Aug. 29, 2023, 10 pages.

* cited by examiner

CLEARANCE ADJUSTMENT MEMBER AND FIXING APPARATUS HAVING THE SAME

CROSS REFERENCE TO RELATED APPLICATION

The present application claims priority to Republic of Korea Patent Application No. 10-2021-0193658, filed Dec. 31, 2021, which is incorporated by reference in its entirety.

BACKGROUND

Field

The present disclosure relates to a clearance adjustment member and a fixing apparatus including the clearance adjustment member. More particularly, the present disclosure relates to a clearance adjustment member capable of adjusting a clearance between a wall and a display device precisely and simply, correcting a position to install a display device and stably fixing a display device, and a fixing apparatus including the clearance adjustment member.

Description of the Related Art

A technology to manufacture a display is further advancing, and recently, organic light emitting displays and the like become popular as premium products.

In particular, an organic light emitting display makes implementation of a rollable display possible and is comparable to a wall mounting display apparatus thanks to thinness and lightness.

In the premium television (TV) market, a large area display tends to be preferred, and thus, a large screen is installed on a wall by combining a plurality of displays in a module method, providing excellent display quality and sense of immersion.

In this case, when installing a large area display on a wall, stable fixing of a display in the wall should be made possible, and when installing a display on a wall, it is required to install the display by contacting the display as close as possible with a wall in order to reduce infringement of a living space and improve emersion into an image.

However, the conventional method of fixing a display is to install a bracket on a wall surface and fix a rear surface of the display with various parts and adjust a clearance. A worker should adjust the clearance between a wall and the display by putting hands into a space between a wall and the display.

Such conventional method may have problems that the worker should bear high workload and a clearance between a wall and the display may not be adjusted properly. In particular, when arranging a plurality of displays in a module method, there may be a level difference among the displays which leads to degraded satisfaction of a user. Also, the worker should adjust a display several times again to fix the level difference. Therefore correction is difficult and a workload of the worker increases.

SUMMARY

The present disclosure is invented to solve related technical problems as above, and aims to provide a clearance adjustment member capable of adjusting a clearance between a wall and a display device precisely, correcting a position to install a display device and fixing a display device stably, and a fixing apparatus including the same.

In one embodiment, a clearance adjustment member comprises: a magnetic force unit including a through hole, the magnetic force unit configured to be attached to a bracket that is mounted on a wall; a screw beam disposed in the through hole of the magnetic force unit; and an adjustment unit connected to the screw beam, the adjustment unit configured to move along the screw beam to adjust a clearance between the wall and a display device that is to be connected to the adjustment unit.

In one embodiment, a fixing apparatus comprises: a bracket configured to be attached to a wall; a clearance adjustment member configured to attach to the bracket and adjust the clearance between the wall and the display device; a fixing bar configured to connect to the clearance adjustment member and the bracket, the fixing bar configured to secure a position of the clearance adjustment member in the bracket; and a lever member configured to secure the fixing bar to the bracket.

In one embodiment, a clearance adjustment member comprises: a first magnetic end configured to attach to bracket mounted on a wall; a second end that is opposite the first magnetic end, the second end configured to attach to a display device; and an adjustment unit between the first magnetic end and the second end, at least a portion of the adjustment unit configured to rotate to adjust a clearance between the display device and the wall.

According to the present disclosure, it becomes possible to adjust a clearance between a wall and a display device precisely and simply.

In addition, the installation position of the display device on the wall can be easily modified by attaching and detaching the display device by magnetic force.

In addition, the display device can be stably fixed to the wall and can be easily detached.

DETAILED DESCRIPTION

Figure 1:
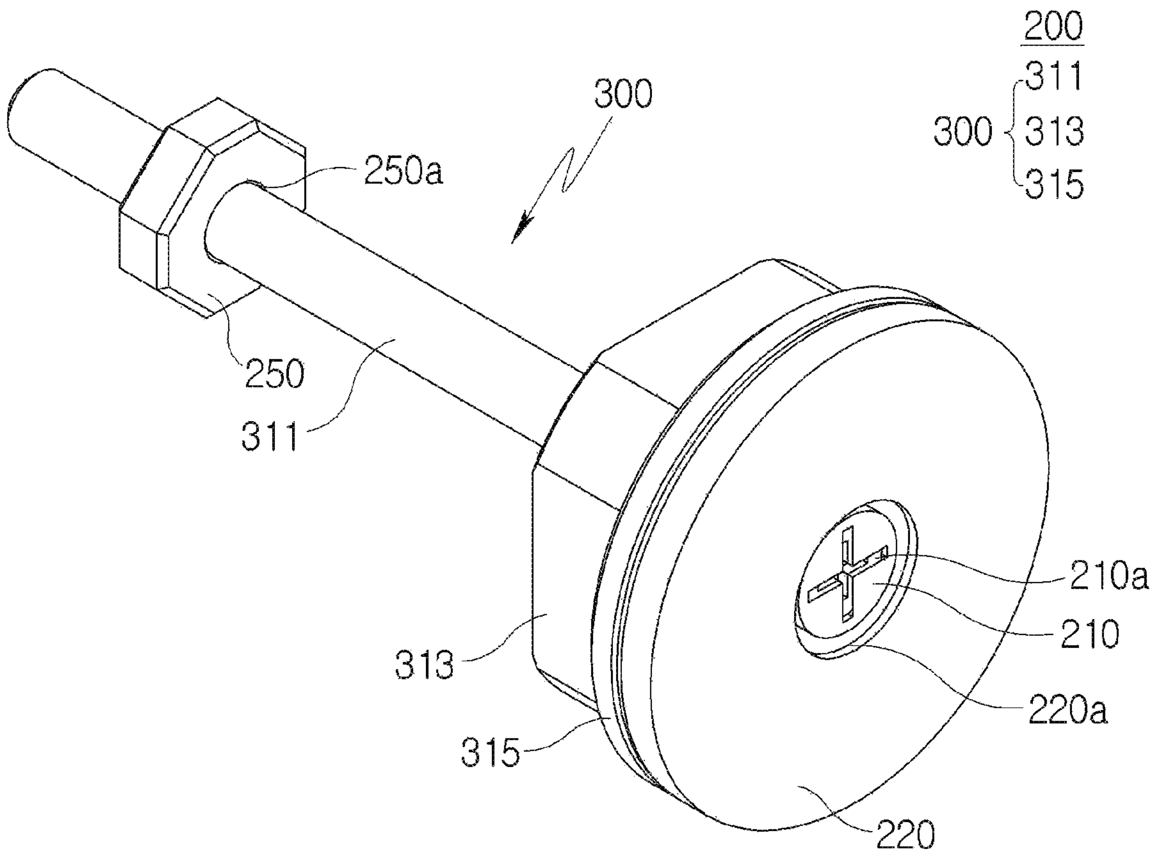
FIG. 1 is a perspective view showing a first embodiment of the clearance adjustment member.

The features, advantages and method for accomplishment of the present disclosure will be more apparent from referring to the following detailed embodiments described as well as the accompanying drawings. However, the present disclosure is not limited to the embodiments disclosed hereinafter and can be implemented in various different forms. These embodiments are provided so that the present disclosure can be thorough and complete, and can fully convey the scope of the present disclosure to a person skilled in the art, and the present disclosure is defined only by the scope of the claims.

It is to be understood that the present disclosure is not limited to accompanying drawings since shapes, sizes, ratio, angles, counts and the like presented in the drawings are taken merely as examples to explain embodiments. Like reference numerals denote like elements throughout the disclosure. In addition, in describing the present disclosure, if a description of a related known art in detail is deemed to unnecessarily obscure the substance of the present disclosure, description of such art will be omitted. When terms, 'comprise', 'have' and 'be achieved' and the like, are used in the present disclosure, other object not mentioned therein may be added unless the terms are used with the term 'only'. The singular forms expressed herein are intended to include the plural forms as well unless the context expressly indicates otherwise.

Components are interpreted to include an error range unless otherwise expressly stated.

In case of describing positions, for example, when describing position relation between two parts with terms such as 'in', 'upon', 'below', 'next' and the like, one or more intervening parts may be disposed between the two parts, unless the terms are used with terms 'immediately' or 'directly'.

When an element or layer is disposed 'on' the other element or layer, another element or layer may be disposed directly on the other element or layer or therebetween.

Though terms such as 'a first,' or 'a second' are used to describe various components, these components are not confined by these terms. These terms are merely used to distinguish one component from the other component. Therefore, a first component being mentioned in the description below may be a second component in a technical concept of the present disclosure.

Like reference numerals denote like elements throughout the disclosure.

Sizes and thicknesses in the accompanying drawings are chosen for convenience of describing the specification; thus, the present disclosure is not limited by the illustrated sizes and thicknesses of the drawings.

The features of various aspects of the present disclosure can be partially or entirely connected or combined with each other and can be interlocked and operated in technically various ways as will be fully understood by those skilled in the art, and the embodiments can be carried out independently of or in association with each other.

Hereinafter, embodiments of the present disclosure will be described in detail with reference to accompanying drawings. Unless in contradiction, a plurality of embodiments to be explained below may be applied redundantly.

FIGS. 1 to 7 show a first embodiment of the clearance adjustment member 200 according to the present disclosure.

With reference to FIGS. 1 to 7, the first embodiment of the clearance adjustment member 200 according to the present disclosure may include a magnetic force unit 220 (e.g., magnetic force mechanism), a screw beam 210, an adjustment unit 300 (e.g., an adjustment mechanism), and a support block 250. In one embodiment, the term "unit" refers to a mechanical mechanism or mechanical structure configured to perform a function described herein.

The magnetic force unit 220 may include a through hole **220*a* into which the screw beam 210 (e.g., a fastener such as a screw) may be inserted, and the screw beam 210 may include a drive groove 210*a*. In addition, the adjustment unit 300 may include a link plate 315 attached to the magnetic force unit 220, a link beam 311, and an adjusting block 313 for Z-axis adjustment through rotation. In addition, the support block 250 may include an open hole 250*a***.

Figure 2:
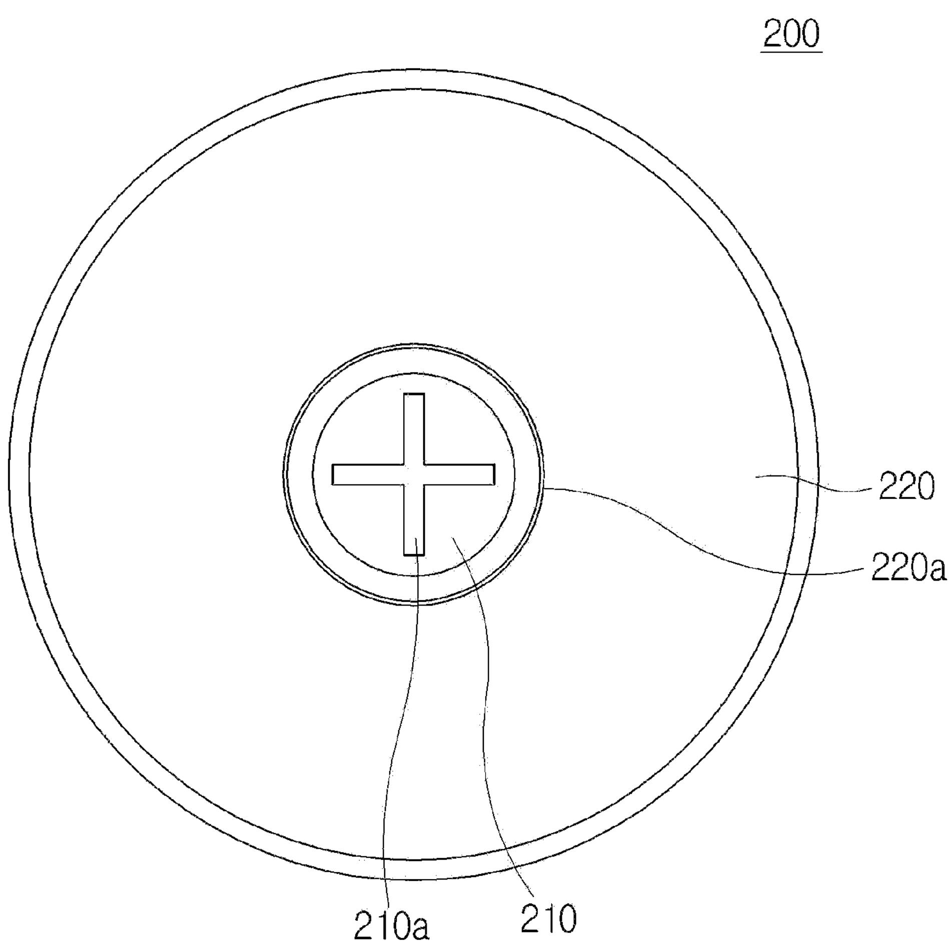
FIG. 2 is a back-side view showing the first embodiment of the clearance adjustment member.

With reference to FIGS. 1 and 2, the magnetic force unit 220 (e.g., a magnet) may have a cylindrical shape, and the through hole **220*a* may be formed in a central portion thereof. The material of the magnetic force unit 220 may be a permanent magnet, but is not necessarily limited thereto. For example, when a structure capable of adjusting magnetic force using electricity is implemented, the magnetic force unit 220** may be an electromagnet.

A bracket 510 (See FIG. 10) may be disposed on a wall (W) on which the display device (D) is installed to fix (e.g., attach) the display device (D) to the wall, and the bracket 510 may be composed of a material which reacts to magnetic force, including metal materials such as iron, aluminum, and the like. The magnetic force unit 220 may be attached to the bracket 510. Since it is a detachable method using magnetic force, the arrangement position of the display device may be easily changed. In addition, recently released display devices such as OLEDs are light in weight and can be attached using only magnetic force.

With reference to FIGS. 1 and 2, the screw beam 210 may be disposed while being inserted into the through hole 220*a*. A driver groove 210*a* may be formed at a rear end of the screw beam 210, and a screw 210*b* (e.g., a threaded section) may be formed at a front end of the screw beam 210. The driver groove 210*a* may have a cross shape, a straight shape, or a hexagon shape, and the shape may be determined according to the type of the working driver used to drive the screw beam 210. An operator inserts a working driver into the driver groove 210*a* and turns it to fasten the screw beam 210 to the adjusting block 313 of the adjustment unit 300 as described below.

Figure 3:
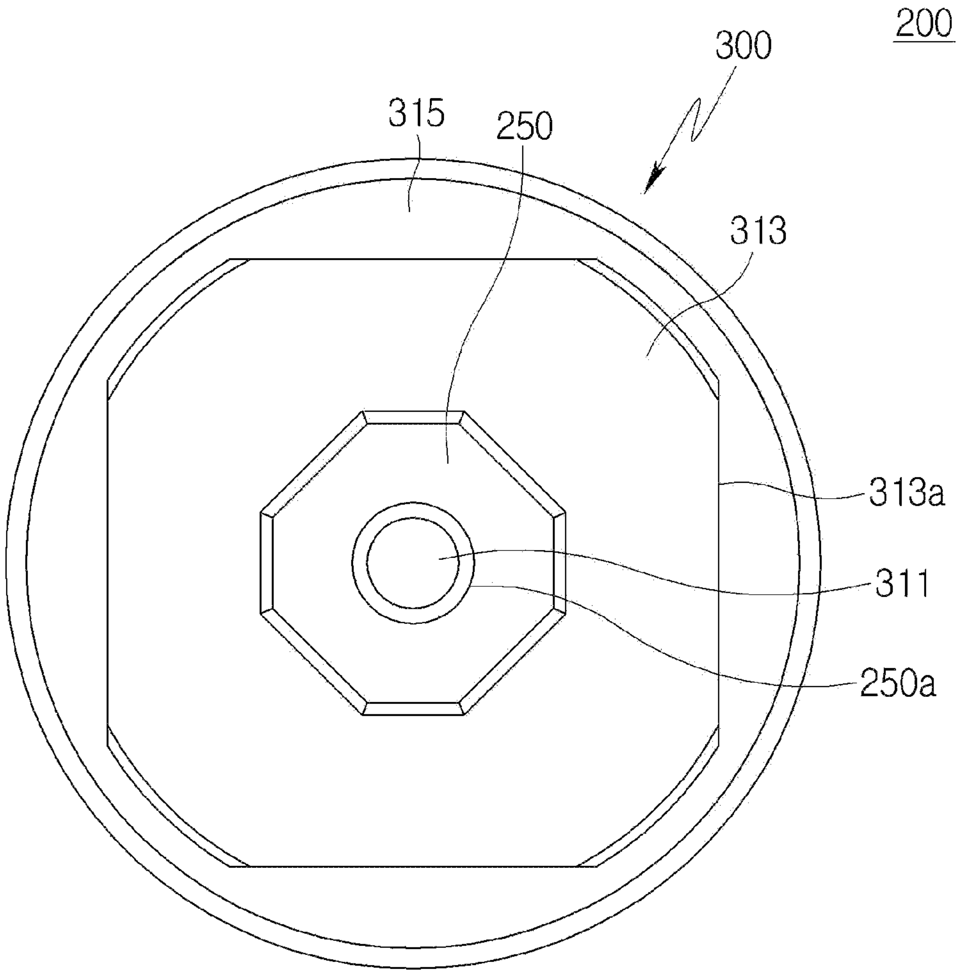
FIG. 3 is a front view showing the first embodiment of the clearance adjustment member.
Figure 4:
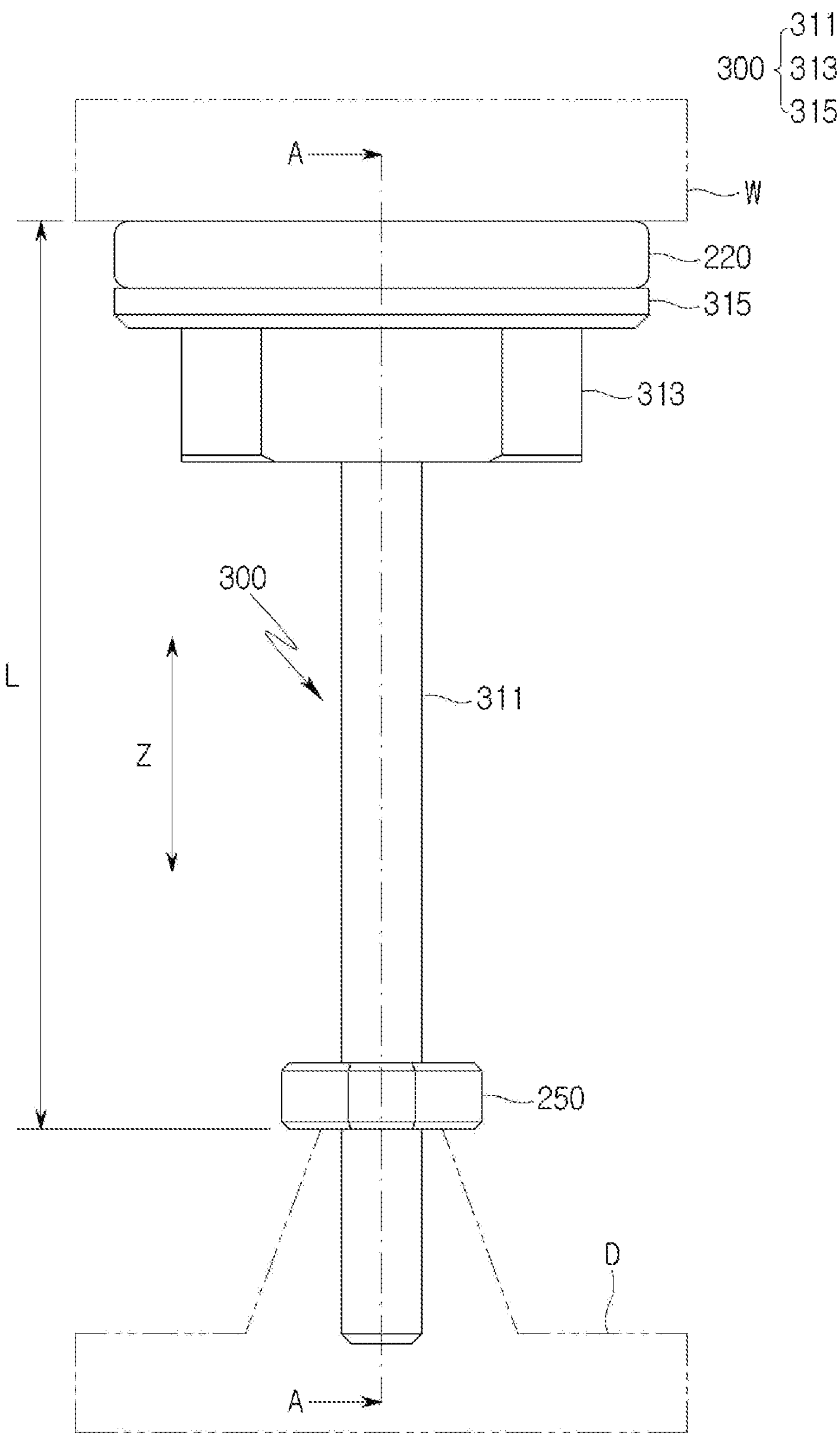
FIG. 4 is a view showing a state in which the first embodiment of the clearance adjustment member is connected between a wall surface and a display device.

With reference to FIGS. 1, 3, and 4, as the adjustment unit 300 is connected to the screw beam 210 and the display device (D) and moves along the screw beam 210, the adjustment unit 300 may adjust the clearance (L) between the wall (W) and the display device (D) (See FIG. 4).

The adjustment unit 300 may include the link plate 315, the link beam 311 and the adjusting block 313.

The link plate 315 may be a material that reacts to magnetic force including metal materials such as iron, aluminum, and the like, and may be a portion to which the magnetic force unit 220 is attached. In addition, the link plate 315 may have a shape corresponding to (e.g., matches) the shape of the magnetic force unit 220, and may have a circular plate shape in the embodiment of the present disclosure, but is not limited thereto.

The link beam 311 may be in the form of a long cylindrical beam (e.g., a rod), and as illustrated in FIG. 4, may be connected to the display device (D) by the support block 250.

The support block 250 may be disposed on the display device (D), and the open hole 250*a* through which the link beam 311 passes may be formed. Accordingly, the link beam 311 may pass through the open hole 250*a* and be inserted into the display device (D) to attach the link beam 311 to the display device (D). Although not shown in the accompanying drawings, a fastening structure capable of connecting the link beam 311 to the display device (D) may be provided inside the display device (D).

In addition, the support block 250 may serve to support the rotation of the link beam 311. When the open hole 250*a* supports the link beam 311 and the link beam 311 rotates together with the adjusting block 313, the link beam 311 can stably rotate while being supported.

Next, the adjusting block 313 (e.g., a nut) may be a part rotated by an operator using a work tool such as a wrench or a spanner. The outer circumference of the adjusting block 313 may be configured in a polygonal pole shape so that it can be rotated by being inserted into a work tool. In the embodiment of the present disclosure, as illustrated in FIG. 3, the outer circumference of the adjusting block 313 may have a quadrangular pole shape in which a flat surface 313*a* (e.g., a flat side surface) is formed at intervals of 90 degrees, but is not limited thereto, and may be changed according to the shape of the work tool.

Further, one side of the link plate 315 may be connected to one side of the adjusting block 313, and another side (e.g., end) of the link beam 311 may be connected to the magnetic force unit 220 through the link plate 315 and the adjusting block 313. The adjusting block 313 and the link beam 311 may be made of the same material as the link plate 315.

Figure 5:
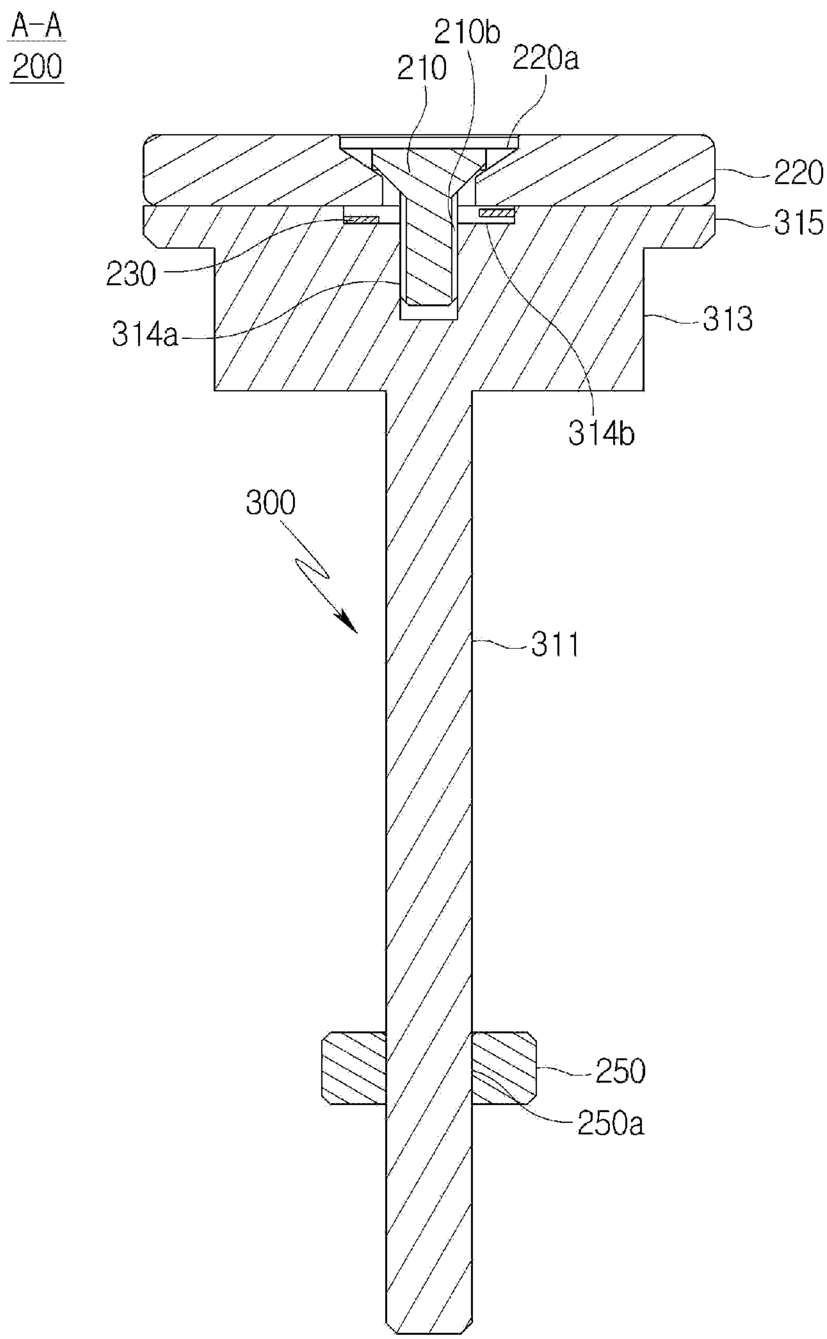
FIG. 5 is a cross-sectional view of the clearance adjustment member along line A-A in FIG. 1 according to one embodiment.

FIG. 5 illustrates a cross-section taken along A-A of the clearance adjustment member 200 according to the first embodiment of the present disclosure.

Referring to FIG. 5, a washer groove 314*b* may be formed inside the link plate 315. A washer 230 (e.g., a lock washer) may be disposed in the washer groove 314*b*, and the washer 230 may apply a pushing force occurring between the magnetic force unit 220 and the link plate 315 by an elastic force to generate tension in the screw beam 210. Accordingly, the screw beam 210 cannot be unintentionally loosened.

Moreover, a thread groove 314*a* may be formed inside the adjusting block 313, and a screw 210*b* formed on an outer circumferential surface of the screw beam 210 may be fastened to the thread groove 314*a*.

In this structure, when an operator rotates the adjusting block 313 using a work tool (e.g., a wrench), the link beam 311 and the link plate 315 rotate together.

At this time, the link beam 311 is supported by the support block 250 and rotates, and as the link plate 315 rotates, the thread groove 314*a* and the screw beam 210 are loosened or tightened with each other.

The screw beam 210 is fixed without rotating due to the tension generated by the washer 230 in a state being inserted into the through hole of the magnetic force unit 220.

Accordingly, when the adjusting block 313 is rotated, the thread groove 314*a* is loosened or tightened along the screw 210*b* of the screw beam 210. In this way, the clearance (L) between the display device (D) and the wall (W) is adjusted. That is, the clearance between the display device (D) and the wall (W) is adjusted in the Z direction (See FIG. 4).

Figure 6:
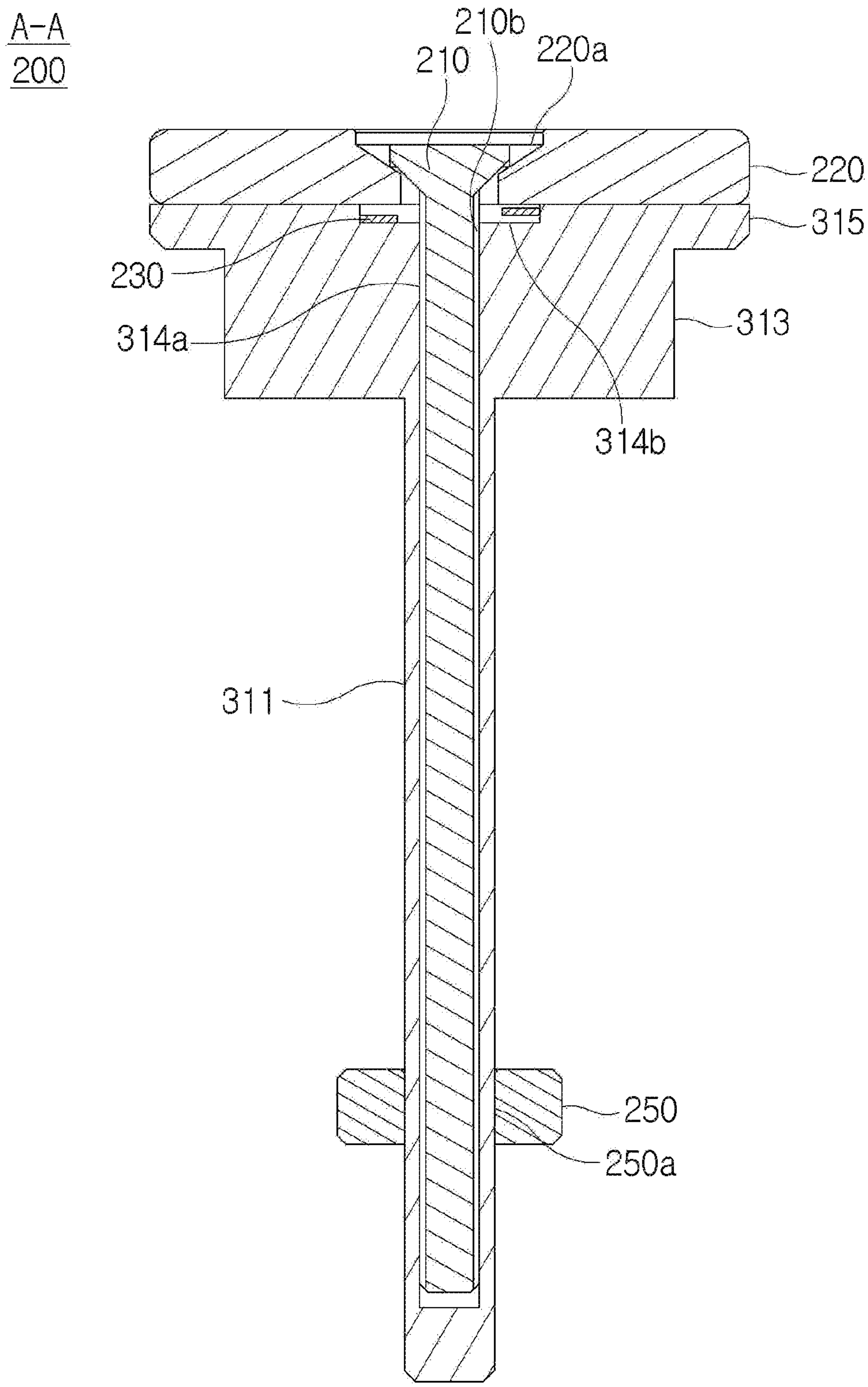
FIG. 6 is a cross-sectional view of the clearance adjustment member along line A-A in FIG. 1 according to another embodiment.

Next, FIG. 6 shows another form of a cross-section taken along A-A of the clearance adjustment member 200 according to the first embodiment of the present disclosure.

Referring to FIG. 6, the thread groove 314*a* formed inside the adjusting block 313 and the screw 210*b* formed on the outer peripheral surface of the screw beam 210 may be fastened to each other.

The shapes of the thread groove 314*a* and the screw beam 210 shown in FIG. 6 are longer than the shapes shown in FIG. 5. Referring to FIG. 6, the screw beam 210 may be inserted into the link beam 311 of the adjustment unit 300. The thread groove 314*a* formed inside the link beam 311 and the screw 210*b* formed on the outer peripheral surface of the screw beam 210 may be fastened to each other.

In this structure, when the operator rotates the adjusting block 313 using a work tool, the range in which the thread groove 314*a* and the screw beam 210 are loosened or tightened with each other is greatly increased. That is, the range of the adjustable clearance (L) between the display device (D) and the wall (W) is increased.

Through the above structure, the first embodiment of the clearance adjustment member 200 according to the present disclosure may easily and precisely adjust the clearance (L) between the wall (W) and the display device (D).

Figure 7:
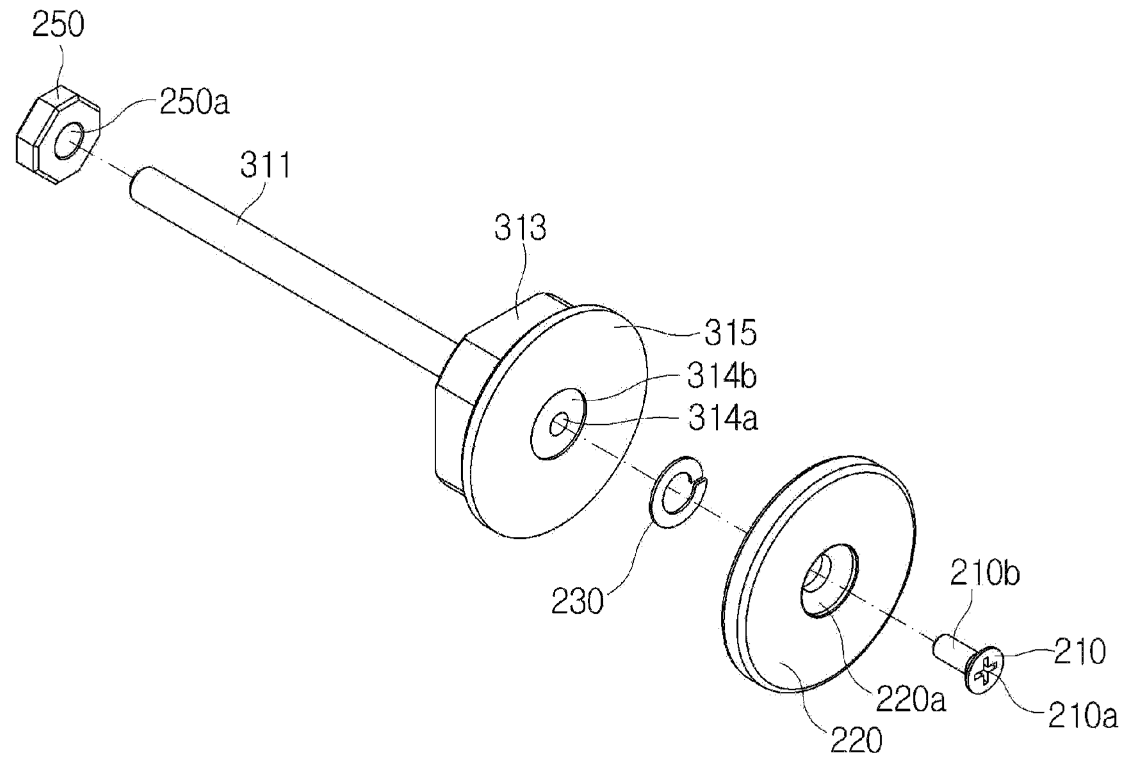
FIG. 7 is an exploded perspective view of the first embodiment of the clearance adjustment member.

FIG. 7 is an exploded perspective view of the clearance adjustment member according to the present disclosure.

Referring to FIG. 7, the magnetic force unit 220, the screw beam 210, the adjustment unit 300 and the support block 250 as described above are combined to become a clearance adjustment member 200 according to the present disclosure. The magnetic force unit 220 may include the through hole 220*a* into which the screw beam 210 may be inserted, and the screw beam 210 may include the drive groove 210*a*. In addition, the adjustment unit 300 may include the link plate 315 attached to the magnetic force unit 220, the link beam 311, and the adjusting block 313 for Z-axis adjustment through rotation. In addition, the support block 250 may include the open hole 250*a*. The screw beam 210 may be disposed while being inserted into the through hole 220*a*. The driver groove 210*a* may be formed at a rear end of the screw beam 210, and a screw 210*b* may be formed at a front end of the screw beam 210. The driver groove 210*a* may have a cross shape, a straight shape, or a hexagon shape and the like, and the shape may be determined according to the type of the working driver. The operator inserts a working screwdriver into the driver groove 210*a* and turns it to fasten the screw beam 210 to the adjusting block 313 of the adjustment unit 300 to be reviewed below.

A second embodiment of the clearance adjustment member 200 according to the present disclosure is illustrated in FIGS. 11 to 15.

Figure 11:
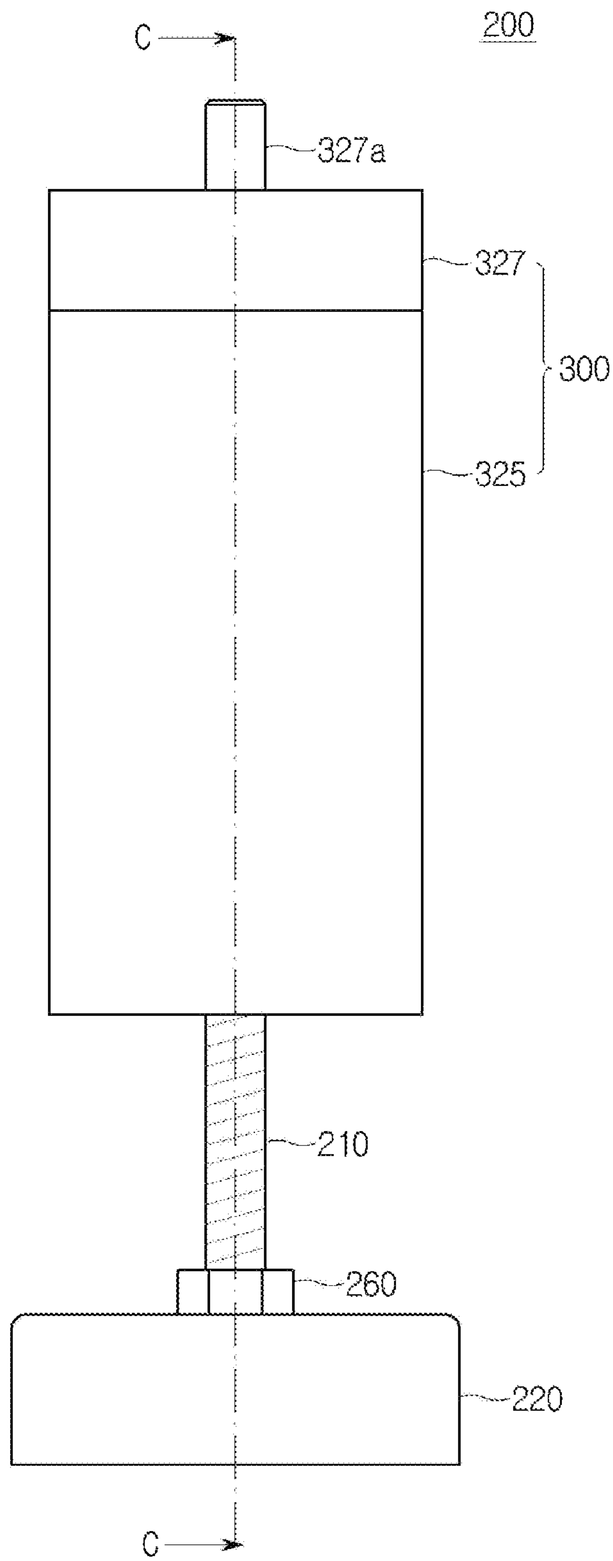
FIG. 11 is a side view showing a second embodiment of the clearance adjustment member.
Figure 12:
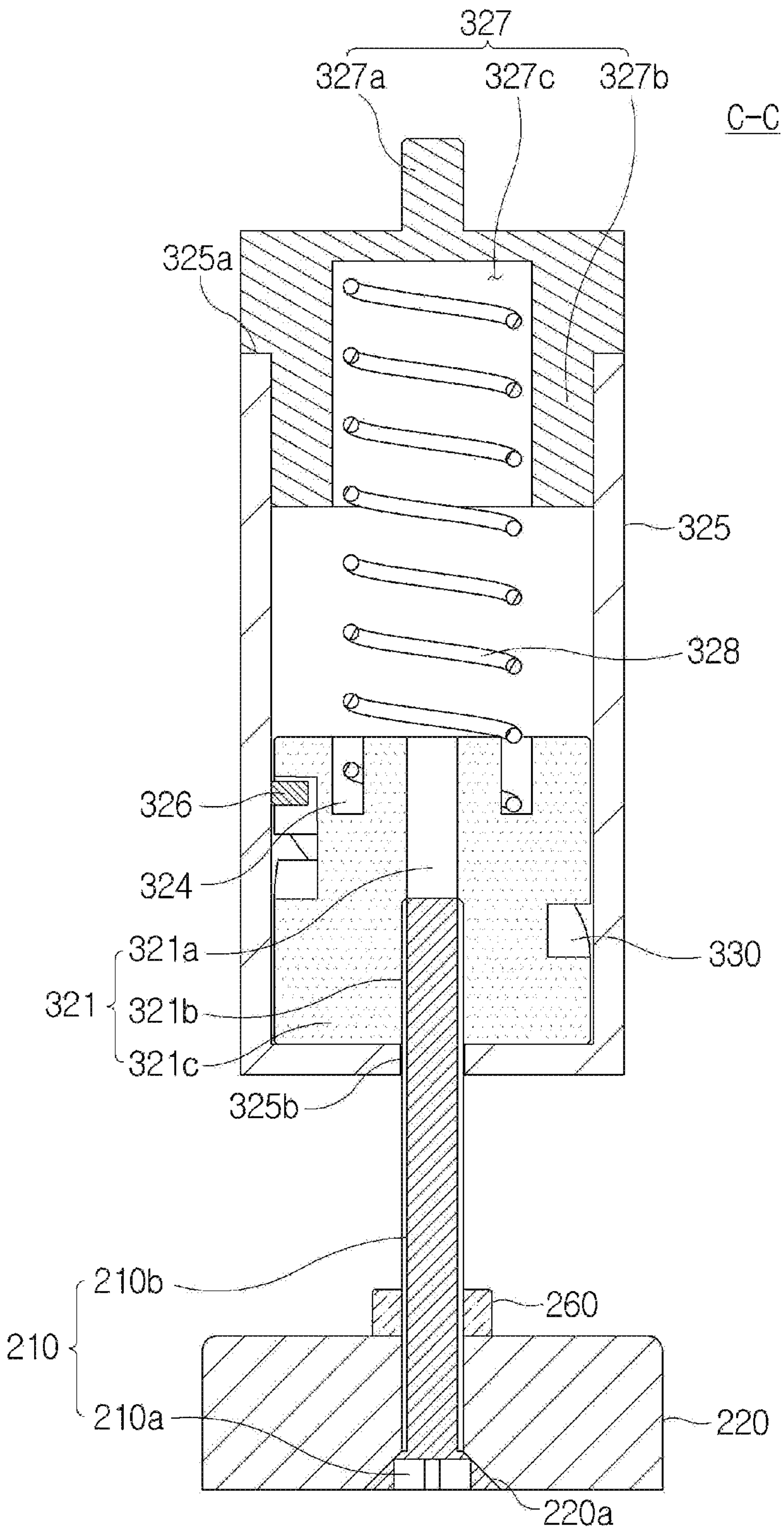
FIG. 12 is a cross-sectional view of the clearance adjustment member along line C-C shown in FIG. 11 according to one embodiment.
Figure 13:
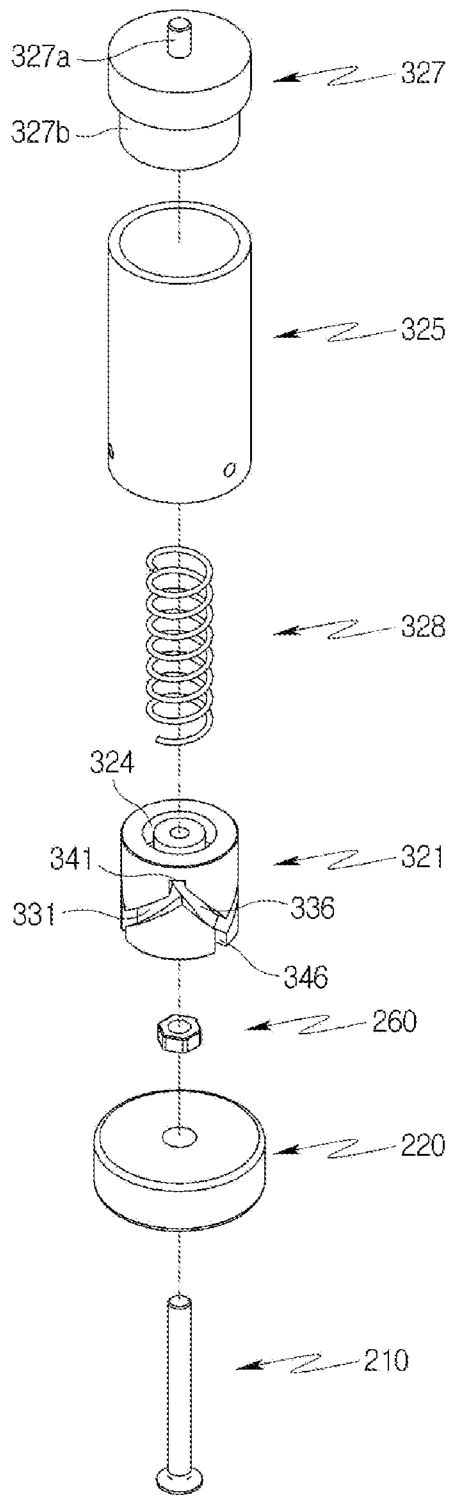
FIG. 13 is an exploded perspective view of the second embodiment of the clearance adjustment member.

Referring to FIGS. 11 to 13, the second embodiment of the clearance adjustment member 200 according to the present disclosure may include the magnetic force unit 220, the screw beam 210, the adjustment unit 300 and a nut 260 (e.g., a fastener).

The magnetic force unit 220 may include the through hole 220*a*, and the screw beam 210 may include the driver groove 210*a* and the screw 210*b*. Further, the adjustment unit 300 may include a housing 325, a cover 327, an elastic body 328 and a guide cam 321. In addition, the housing 325 may include an open hole 325*a* and a beam hole 325*b*, and the cover 327 may include a protrusion 327*a* and an inserting portion 327*b*.

The magnetic force unit 220 may have a cylindrical shape and the through hole 220*a* may be formed in the central portion. The material of the magnetic force unit 220 may be a permanent magnet, but is not necessarily limited thereto. For example, when a structure capable of adjusting magnetic force using electricity is implemented, the magnetic force unit 220 may be an electromagnet.

The bracket 510 may be disposed on the wall (W) where the display device (D) is installed to fix the display device (D), and the bracket 510 may be made of a material that reacts to magnetic force including a metal material such as iron, aluminum and the like. The magnetic force unit 220 may be attached to the bracket 510. Since it is a detachable method using magnetic force, the arrangement position of the display device may be easily changed.

The screw beam 210 may be disposed while being inserted into the through hole 220*a* of the magnetic force unit 220. The driver groove 210*a* may be formed at a rear end of the screw beam 210, and a screw 210*b* may be formed around an outer circumference of the screw beam 210. The driver groove 210*a* may have a cross shape, a straight shape, or a hexagon shape and the like, and the shape may be determined according to the type of the working driver. The operator inserts a working screwdriver into the driver groove 210*a* and turns it to fasten the screw beam 210 to the guide cam 321 of the adjustment unit 300 to be reviewed below.

The rear end of the screw beam 210 is inserted into the through hole 220*a* formed on a rear end surface of the magnetic force unit 220, and the nut 260 is disposed on the front-end surface of the magnetic force unit 220, and the screw beam 210 and the magnetic force unit 220 may be connected together by fastening the nut 260 to the screw beam 210.

The adjustment unit 300 is connected to the screw beam 210 and the display device (D), and moves along the screw beam 210, thereby adjusting the clearance between the wall (W) and the display device (D).

The adjustment unit 300 may include the housing 325, the cover 327, the elastic body 328 and the guide cam 321.

The housing 325 may have a cylindrical shape with a space formed therein, the beam hole 325*b* through which the screw beam 210 passes is formed at one end of the housing 325, and the open hole 325*a* that is larger than the beam hole 325*b* may be formed at another end of the housing 325.

The inserting portion 327*b* is formed at one end of the cover 327, is coupled to the open hole 325*a* of the housing 325, and may seal the housing 325. The protrusion 327*a* may be formed at another end of the cover 327 to be connected to the display device (D). Although not shown in the drawings, a structure for connecting the protrusion 327*a* of the cover 327 to the display device (D) may be provided in the display device (D). A receiving space 327*c* in which a part of the elastic body 328 (e.g., a spring) is accommodated may be formed in the cover 327.

The guide cam 321 may be disposed inside the housing 325. Further, the guide cam 321 may include a body 321*c*, the screw groove 321*a* formed at one end of the guide cam 321 and connected to the screw beam 210, and a thread 321*b* formed on an inner circumferential surface of the screw groove 321*a*. The thread 321*b* of the guide cam 321 and the screw 210*b* of the screw beam 210 may be engaged and fastened. In addition, the guide cam 321 may further include a receiving groove formed at another end of the guide cam 321. A part of the elastic body 328 may be accommodated in the receiving groove 324.

The elastic body 328 may be disposed inside the housing 325 between the receiving groove 324 of the guide cam 321 and the receiving space 327*c* of the cover 327. The elastic body 328 is compressed when the guide cam 321 moves in the first direction (Z1) (See FIG. 14A), and may provide a restoring force for the guide cam 321 to move in the second direction (Z2) (See FIG. 14*a*).

As shown in FIGS. 12-14, in the second embodiment of the present disclosure, the adjustment unit 300 may further include the guide pin 326, a guide line 330, a first end groove 341 and a second end groove 346.

The guide pin 326 may be disposed to protrude from the inside of the housing 325. The guide pin 326 may have a cylindrical shape in the embodiment of the present disclosure, which is to smoothly move the guide line 330. However, the present disclosure is not necessarily limited thereto.

The guide line 330 may be formed on an outer circumference of the guide cam 321, and the guide pin 326 may be inserted thereinto. Here, the guide line 330 may include a first guide line 331 and a second guide line 336. The guide lines may be channels formed in the guide cam 321 that control the direction of movement of the guide cam 321.

When the guide cam 321 rotates, the first guide line 331 moves along the guide pin 326 and then, the first guide line 331 may make the guide cam 321 advance in a first direction (Z1) that compresses the elastic body 328. The first guide line 331 may be curved from the first direction (Z1) to the second direction (Z2).

When the guide cam 321 rotates, the second guide line 336 may move along the guide pin 326 and make the guide cam 321 move backward in the second direction (Z2) extending the elastic body 328. The second guide line 336 may be curved from the second direction (Z2) to the first direction (Z1).

In this case, the first guide line 331 and the second guide line 336 may be connected to each other and may be alternately disposed along the outer circumference of the guide cam 321.

Figure 14A:
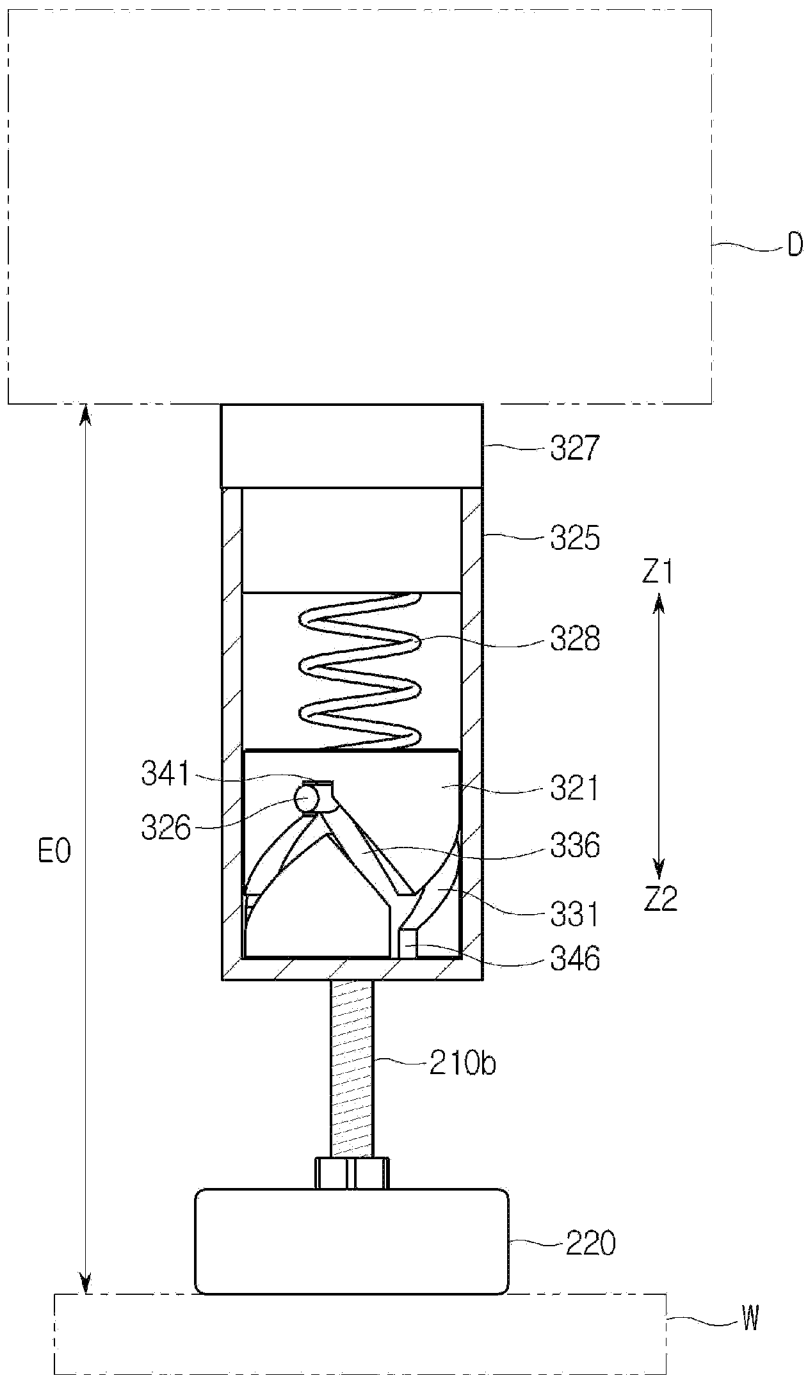
FIGS. 14A to 14C are diagrams showing an operation method of adjusting a clearance between a wall surface and a display device using the second embodiment of the clearance adjustment member.
Figure 15A:
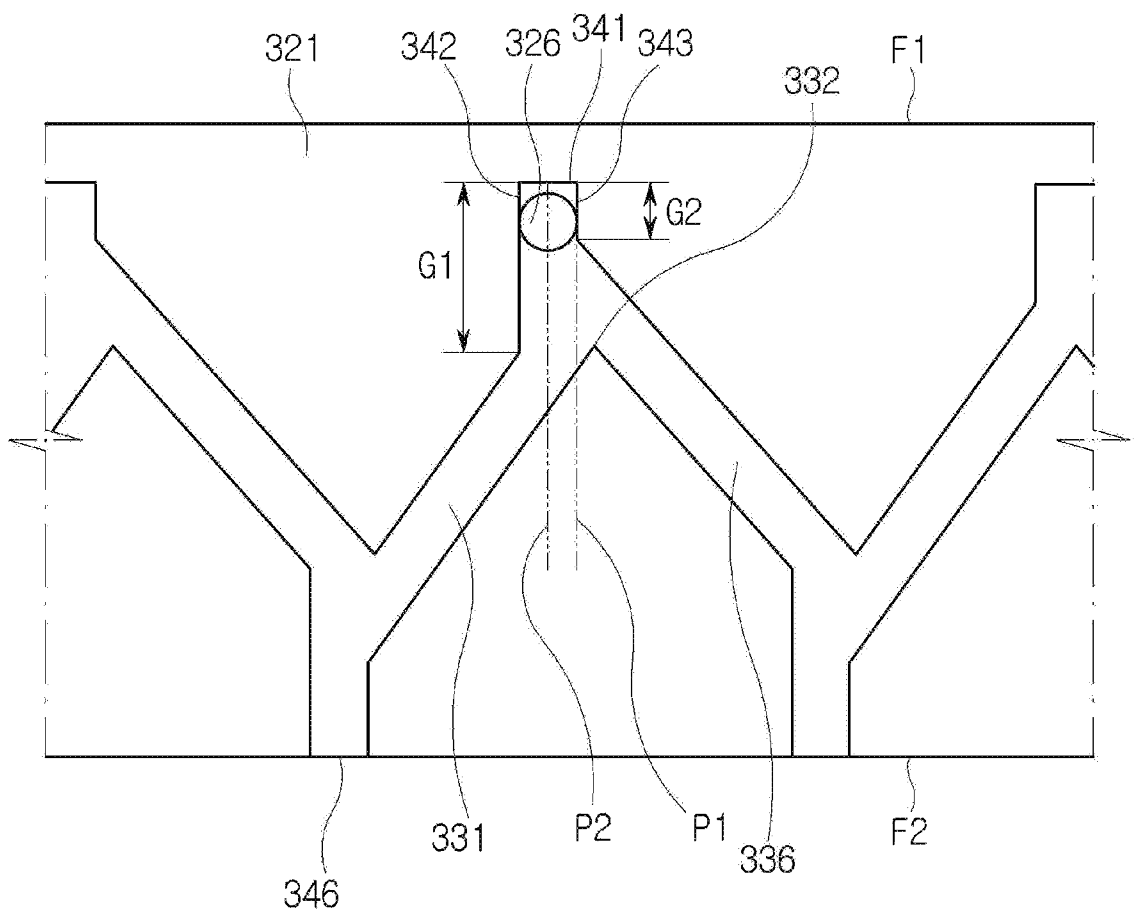
FIGS. 15A to 15C are views showing a movement structure of a guide cam and a guide pin when a clearance between a wall surface and a display device is increased using the second embodiment of the clearance adjustment member.

Next, referring to FIGS. 14A and 15A, the first end groove 341 may be disposed adjacent to a first surface (F1) of the guide cam 321. Also, the first end groove 341 may be disposed to connect an end (e.g., a first end) of the first guide line 331 and an end (e.g., a second end) of the second guide line 336, and may be formed to extend in the first direction (Z1).

Here, a 1-1 (e.g., a first) groove surface portion 342 and a 1-2 (e.g., a second) groove surface portion 343 may be respectively formed on a first side and a second side of the first end groove 341. The 1-1 groove surface portion 342 may be connected to an end of the first guide line 331 and the 1-2 groove surface portion 343 may be connected to an end of the second guide line 336.

In this case, a length (G1) of the 1-1 groove surface portion 342 and a length (G2) of the 1-2 groove surface portion 343 may be different from each other. In the embodiment of the present disclosure, the length (G1) of the 1-1 groove surface portion 342 may be formed longer than the length (G2) of the 1-2 groove surface portion 343.

The reason why the length (G1) of the 1-1 groove surface portion 342 is formed longer than the length (G2) of the 1-2 groove surface portion 343 is to cause the guide pin 326 moved along the second guide line 336 to hit against the groove surface portion 342, thereby the guide pin 326 moves to an inside of the first end groove 341.

Since the length (G1) of the 1-1 groove surface portion 342 is formed longer than the length (G2) of the 1-2 groove surface portion 343, the guide pin 326 may be guided into the first end groove 341 without moving to the first guide line 331 connected to the second guide line 336.

Meanwhile, a first boundary portion 332 in which an end of the second guide line 336 and an end of the first guide line 331 are in contact with each other may be disposed on the guide cam 321.

When the guide cam 321 rotates, the first boundary portion 332 may be located collinearly with the first extending line (P1) passing through the 1-2 groove surface portion 343 (e.g., extending from the 1-2 groove surface portion 343) or may be located more towards a rotation direction (See the arrow K indicating the rotation direction) with respect to the first extending line P1, in order to prevent the guide pin 326 from moving back to the second guide line 336.

In addition, in order to make the guide pin 326 moved towards an inside of the first end groove 341 move towards the first guide line 331 when the guide cam 321 rotates, a second extending line (P2) passing through a centerline of the first end groove may be formed more towards an opposite direction to a rotation direction of the guide cam with respect to the first extending line (P1).

As the first boundary portion 332 is located more towards the rotation direction with respect to the first extending line (P1), the second extending line (P2) is formed more towards the opposite direction to the rotation direction with respect to the first extending line (P1), the guide pin 326, which moved towards the inside of the second end groove 346 after moving along the first guide line 331, may be introduced into the second guide line 336 instantly, while backward movement towards the first guide line 331 blocked, when the guide cam 321 rotates continuously. A specific operation principle will be described below.

Next, the second end groove 346 may be disposed adjacent to a second surface (F2) of the guide cam 321. Also, the second end groove 346 may be disposed to connect an end (e.g., a second end) of the first guide line 331 and an end (e.g., a second end) of the second guide line 336, and may be formed to extend in the second direction (Z2).

Here, the 2-1 groove surface portion 347 and the 2-2 groove surface portion 348 may be formed on both sides of the second end groove 346, and the 2-1 groove surface portion 347 may be connected to an end of the first guide line 331, and the 2-2 groove surface portion 348 may be connected to an end of the second guide line 336.

In this instance, a length (G3) of the 2-1 groove surface portion 347 and a length (G4) of the 2-2 groove surface portion 348 may be different from each other. In the embodiment of the present disclosure, a length (G4) of the 2-2 groove surface portion 348 may be formed longer than a length (G3) of the 2-1 groove surface portion 347.

The reason why the length (G4) of the 2-2 groove surface portion 348 is formed longer than the length (G3) of the 2-1 groove surface portion 347 is to cause the guide pin 326 moved along the first guide line 331 to hit against the 2-2 groove surface portion 348, thereby the guide pin 326 moves to an inside of the second end groove 346.

As the length (G4) of the 2-2 groove surface portion 348 is formed longer than the length (G3) of the 2-1 groove surface portion 347, the guide pin 326 may be introduced into an inside of the second end groove 346 instantly, without moving to the second guide line 336 connected to the first guide line 331.

Meanwhile, in the guide cam 321, the second boundary portion 333 may be disposed, in which an end of the second guide line 336 and an end of the first guide line 331 are in contact with each other.

In order to prevent backward movement of the guide pin 326, which moved towards an inside of the second end groove 346, towards the first guide line 331 when the guide cam 321 rotates, the second boundary portion 333 may be disposed collinearly with the third extending line (P3) passing through the 2-1 groove surface portion 347 or may be disposed more towards a rotation direction (See the arrow K indicating the rotation direction) with regard to the third extending line (P3).

Moreover, in order to make the guide pin 326, which moved towards an inside of the second end groove, move towards the second guide line 336 when the guide cam 321 rotates, a fourth extending line (P4) passing through a centerline of the second end groove 346 may be formed more towards an opposite direction to the rotation direction of the guide cam 321 with respect to the third extending line (P3).

As the second boundary portion 333 is disposed more towards the rotation direction with respect to the third extending line (P3) mentioned above, and the fourth extending line (P4) is disposed more towards the opposite direction to the rotation direction with regard to the third extending line (P3), the guide pin 326, which moved towards the inside of the second end groove 346 after moving along the first guide line 331, is introduced into the second guide line 336 instantly, while backward movement towards the first guide line 331 blocked, when the guide cam 321 rotates continuously. A specific operation principle will be described below.

Due to the structure of the first end groove 341 and the second end groove 346 described above, the guide pin 326 may sequentially move the first guide line 331 and the second guide line 336 when the guide cam 321 rotates, and the guide cam 321 may move in the first direction (Z1) or the second direction (Z2).

Figure 14B:
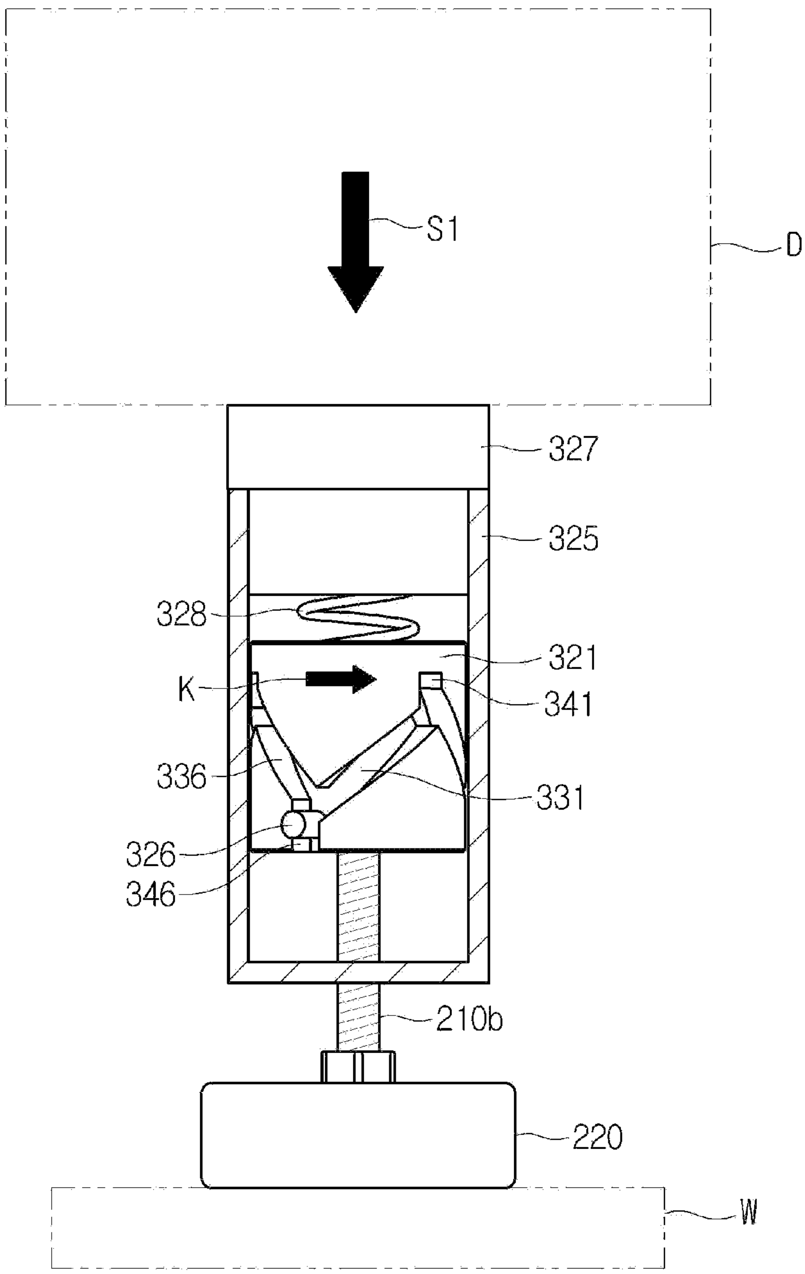
Figure 14C:
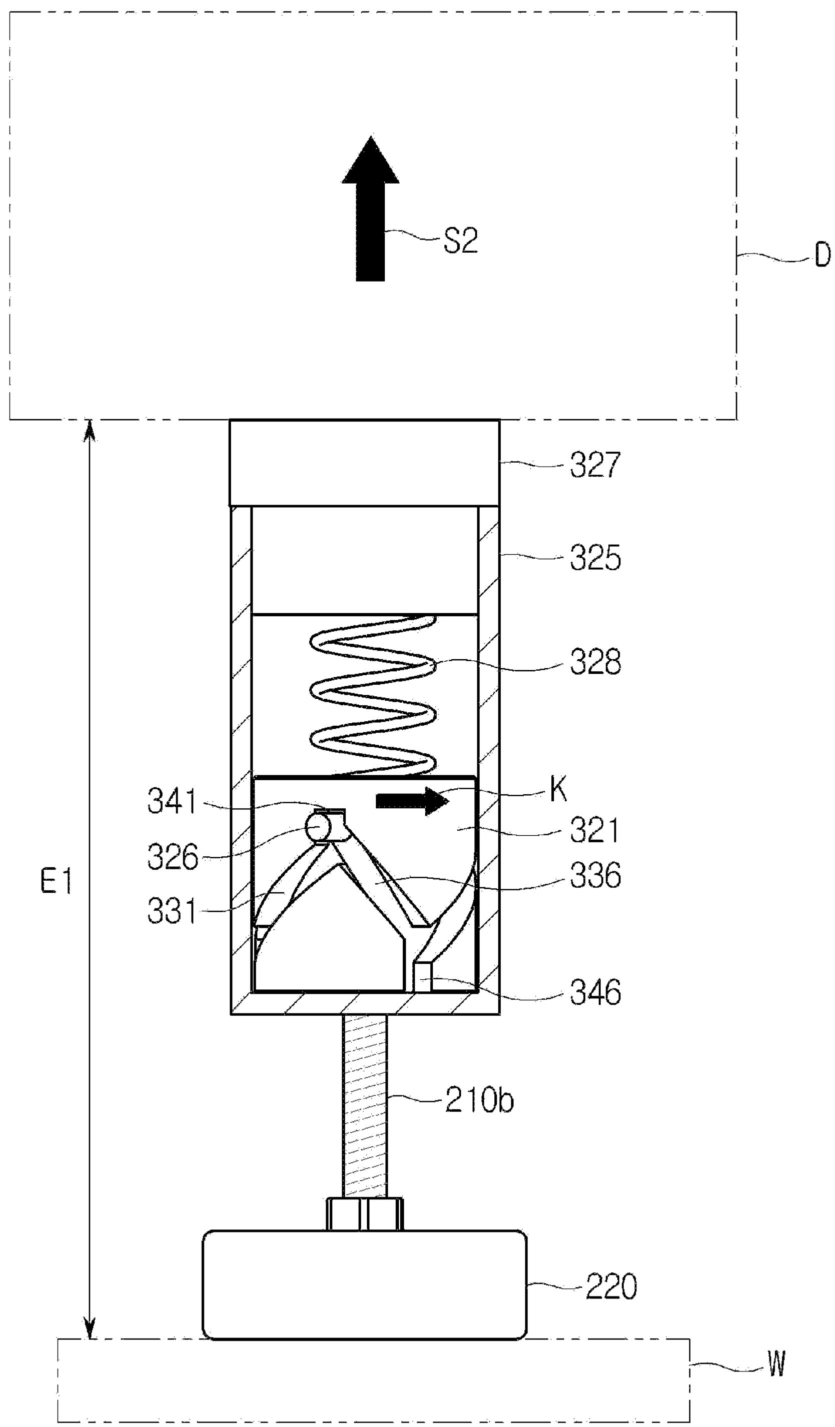
Figure 15B:
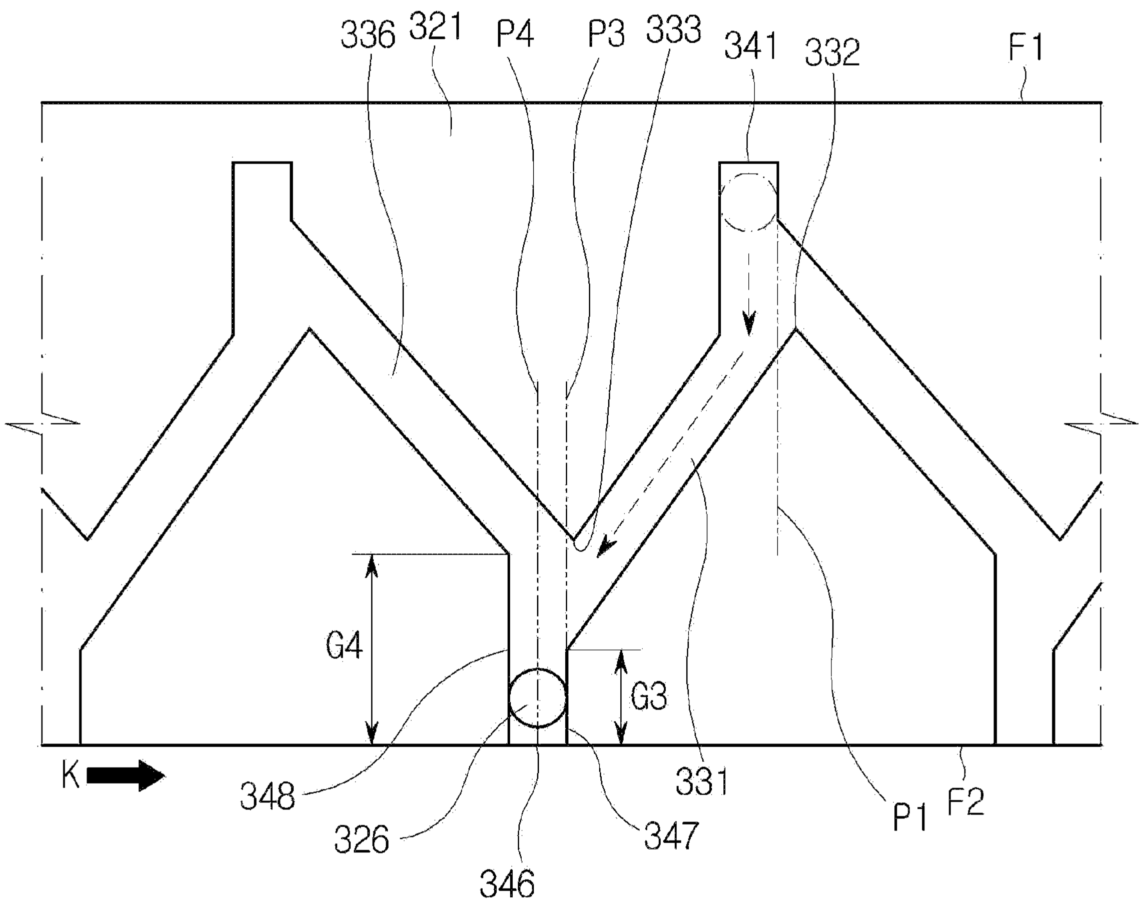
Figure 15C:
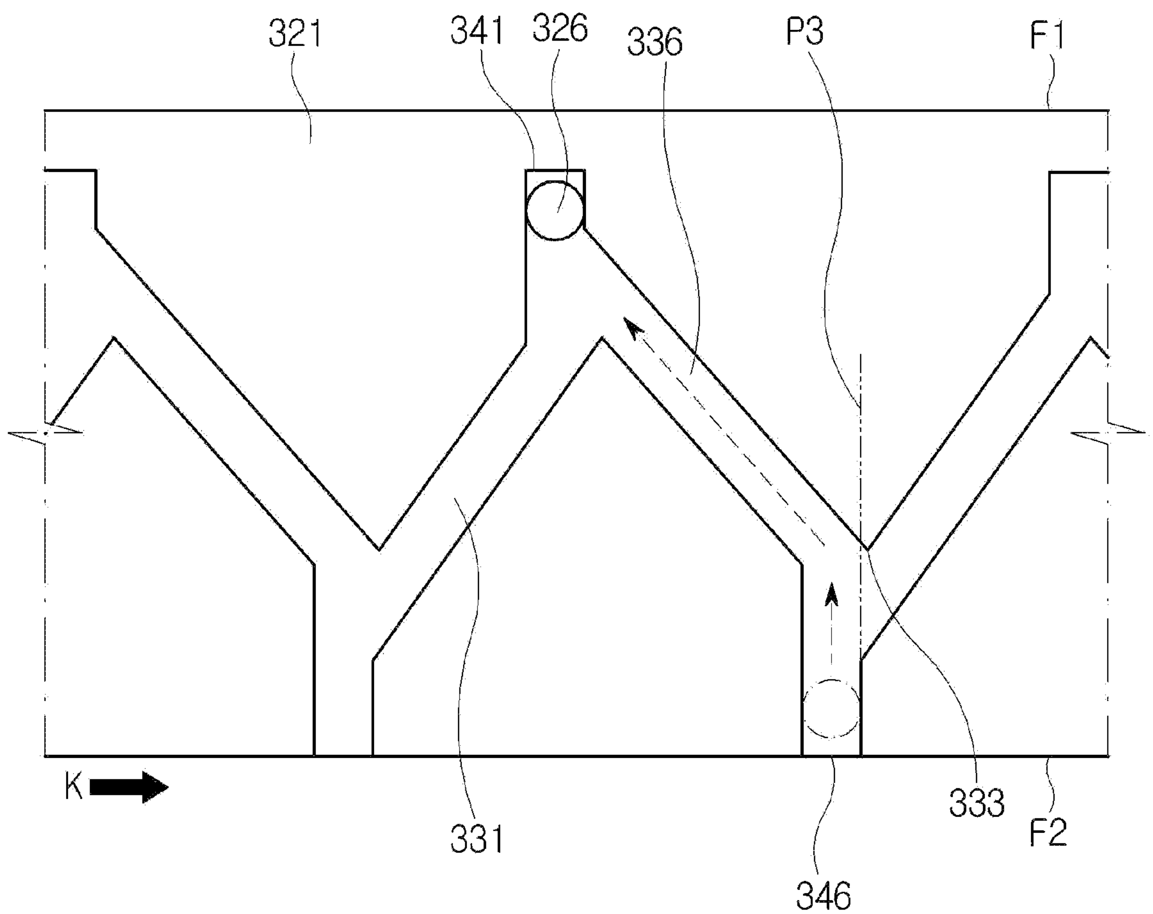

On the other hand, FIGS. 14A to 14C show an operation method of adjusting the clearance between the wall (W) and the display device (D) by applying the clearance adjustment member 200. In addition, FIGS. 15A to 15C show the movement structure of the guide cam 321 and the guide pin 326 when the clearance between the wall (W) and the display device (D) is increased by applying the clearance adjustment member 200.

The rotation direction of the guide cam 321 disclosed in FIGS. 14A to 15A may be a direction to increase the clearance between the wall (W) and the display device (D).

First, as shown in FIG. 14A, the clearance between the display device (D) and the wall (W) is designated as the E0 clearance, and the operation process of adjusting it to the E1 clearance as in FIG. 14C will be described.

Referring to FIGS. 14A and 15A, the guide pin 326 is located in the first end groove 341.

As shown in FIG. 14B, in order to adjust the clearance between the display device (D) and the wall (W), the operator may perform a simple operation of pushing the display device (D) in the direction of the wall (W).

When the operator pushes the display device (D) in the direction of the wall (W) as shown by the arrow (S1), the housing 325 and the cover 327 are pushed in the direction of the wall (W) while the guide cam 321 is connected to the screw beam 210.

The guide pin 326 is arranged inside the housing 325 and located in the first end groove 341, and as the housing 325 and the cover 327 are pushed in the wall (W) direction, the guide pin 326 exits the first end groove 341 and moves along the first guide line 331. Also, as in FIGS. 14B and 15B, the guide pin 326 moves to an inside of the second end groove 346.

In fact, since the position of the guide pin 326 inside the housing 325 is fixed, the guide cam 321 rotates along the screw 210*b* of the screw beam 210, and accordingly the first guide line 331 and the second end groove 346 formed around the outer circumference of the guide cam 321 rotated in the arrow (K) direction.

At this time, the elastic body 328 is in a compressed state, and provides a restoring force so that the housing 325 and the cover 327 move in the first direction (Z1) again.

Next, referring to FIGS. 14C and 15C, the housing 325 and the cover 327 are provided with a restoring force by the elastic body 328 and move in the first direction (Z1), and accordingly the display device (D) moves in the direction of the arrow (S2).

The guide cam 321 rotates along the screw 210*b* of the screw beam 210 in the arrow (K) direction, and the guide pin 326 exits the second end groove 346 and moves along the second guide line 336. Then, the guide pin 326 is located in the first end groove 341 which is the next in order.

As the guide cam 321 rotates in the arrow (K) direction, the winding degree between the guide cam 321 and the screw beam 210 changes, and the clearance between the display device (D) and the wall (W) is adjusted by the changed length.

Finally, the clearance between the display device (D) and the wall (W) is adjusted from the E0 clearance shown in FIG. 14A to the E1 clearance shown in FIG. 14C.

The operator may simply and easily adjust the clearance between the display device (D) and the wall (W) by repeating this operation several times.

Here, by adjusting the total number of times that the first and second guide lines 331 and 336 are connected to each other and alternately arranged around the outer circumference of the guide cam 321, it is possible to precisely control a degree to which the clearance that the screw groove moves along the screw beam 210.

For example, in the embodiment of the present disclosure, the first guide line 331 and the second guide line 336 are connected to each other around the outer circumference of the guide cam 321 and are alternately arranged three times, that is, three sets, and if it is changed to six sets by adjusting the spacing between the two guide lines 331 and 336, it will be possible to adjust the clearance more precisely.

Figure 16A:
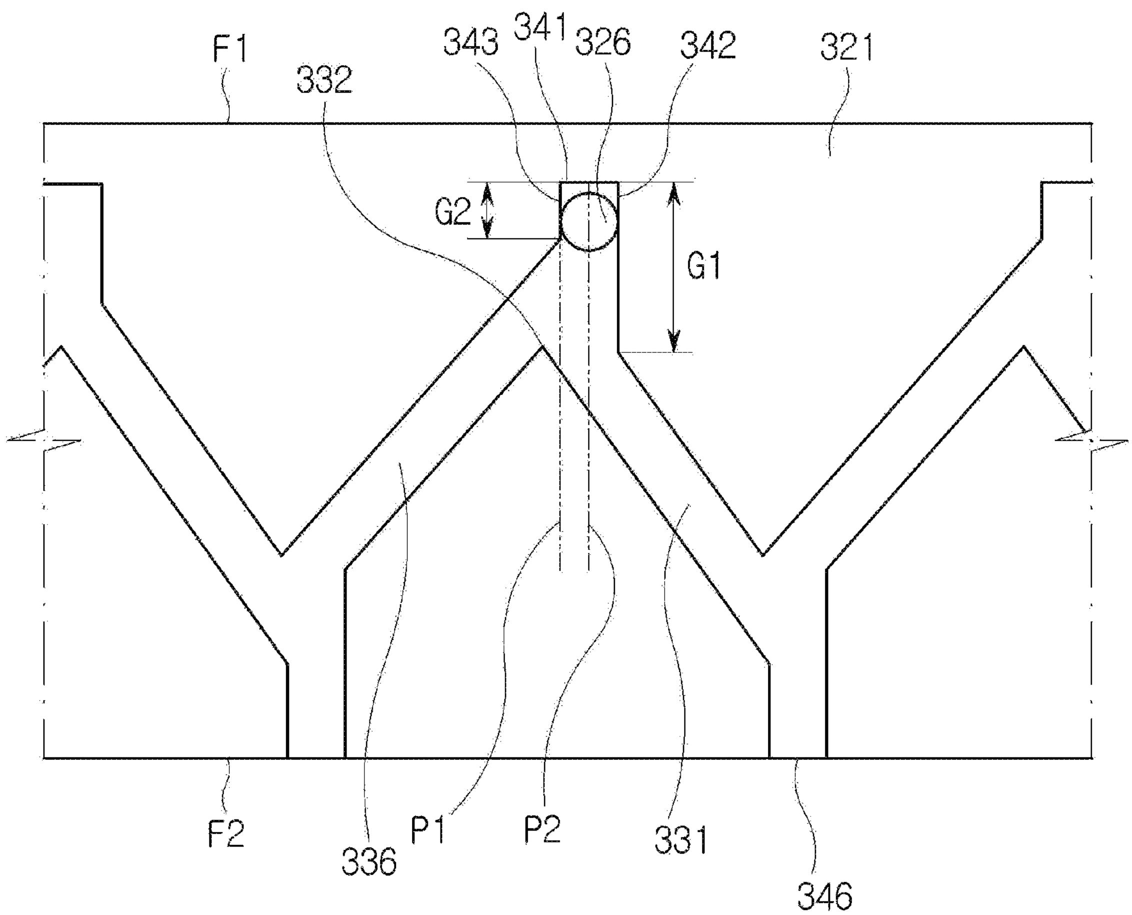
FIGS. 16A to 16C are views showing a movement structure of the guide cam and the guide pin when reducing the clearance between the wall surface and the display device using the second embodiment of the clearance adjustment member.
Figure 16B:
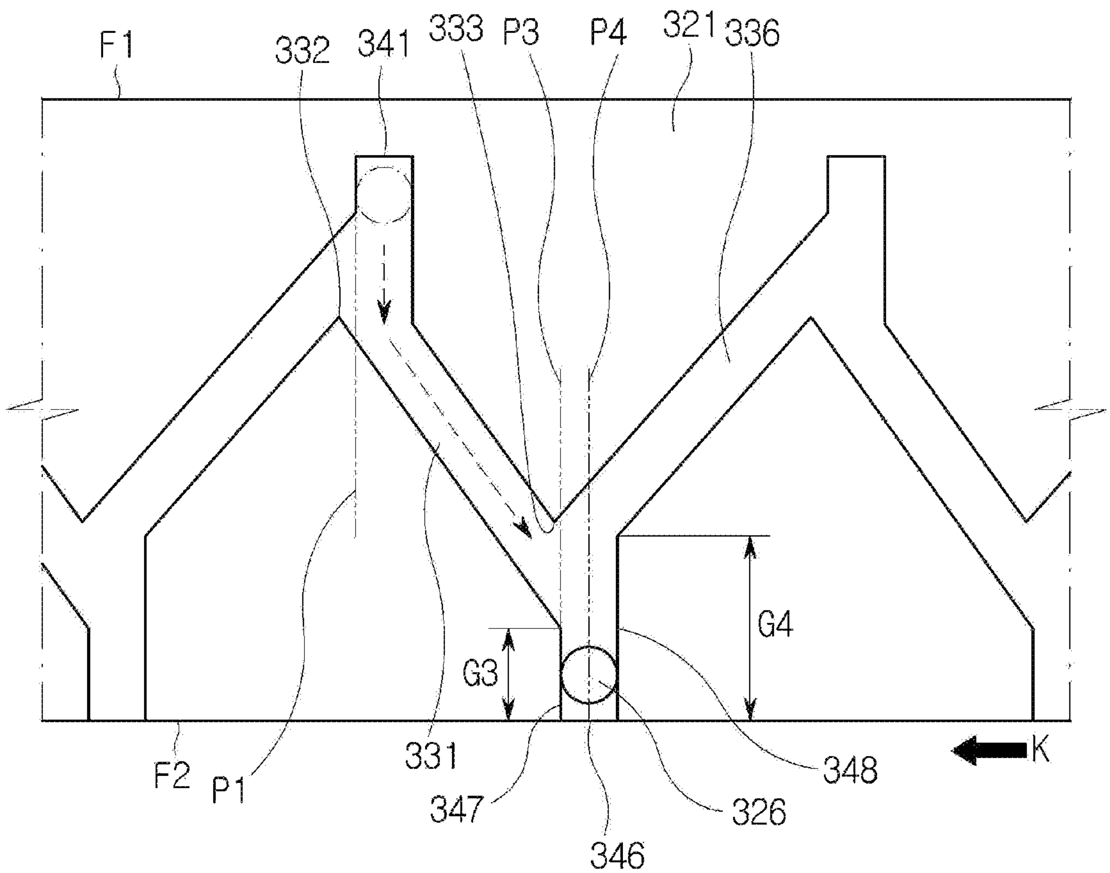
Figure 16C:
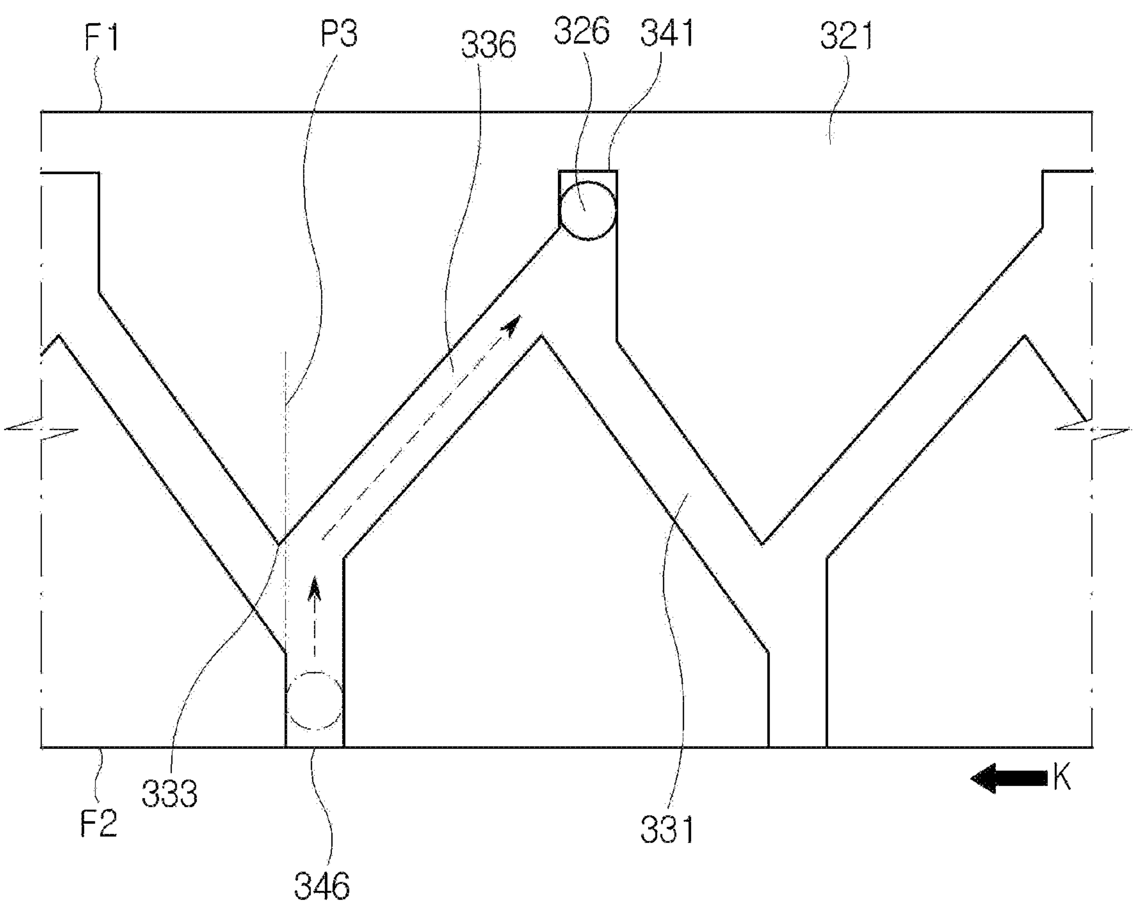

Meanwhile, FIGS. 16A to 16C show the movement structure of the guide cam 321 and the guide pin 326 when the clearance between the wall (W) and the display device (D) is reduced by applying the clearance adjustment member 200.

The rotation direction of the guide cam 321 disclosed in FIGS. 16A to 16C may be a direction to reduce the clearance between the wall (W) and the display device (D).

The first guide line 331 and the second guide line 336 formed in the guide cam 321 shown in FIGS. 16A to 16C are formed in the opposite direction to the first guide line 331 and the second guide line 336 formed in the guide cam 321 shown in FIGS. 15A to 15C.

As described above, the rotation direction of the guide cam 321 disclosed in FIGS. 15A to 15C is a direction to increase the clearance between the wall (W) and the display device (D), and therefore the rotation direction of the guide cam 321 disclosed in FIGS. 16A to 16C is the direction to reduce the clearance between the wall (W) and the display device (D).

Looking at the operation method, first referring to FIG. 16A, the guide pin 326 is located in the first end groove 341.

To adjust the clearance between the display device (D) and the wall (W), the operator may perform a simple operation by pushing the display device (D) in the direction of the wall (W).

When the operator pushes the display device (D) in the direction of the wall (W), the housing 325 and the cover 327 are pushed in the direction of the wall (W) while the guide cam 321 is connected to the screw beam 210.

The guide pin 326 is arranged inside the housing 325 and located in the first end groove 341, and as the housing 325 and the cover 327 are pushed in the wall (W) direction, the guide pin 326 comes out of an inside of the first end groove 341 and moves along the first guide line 331. As shown in FIG. 16B, the guide pin 326 moves to an inside of the second end groove 346.

In fact, since the position of the guide pin 326 inside the housing 325 is fixed, the guide cam 321 rotates along the screw 210*b* of the screw beam 210, and accordingly the second end groove 346 and the first guide line 331 formed around the outer circumference of the guide cam 321 are rotated in the arrow (K) direction.

At this time, the elastic body 328 is in a compressed state, and provides a restoring force so that the housing 325 and the cover 327 move again in the first direction (Z1) (See FIG. 14A).

Next, referring to FIG. 16C, the housing 325 and the cover 327 move in the first direction (Z1) (See FIG. 14A) as the elastic body 328 provides a restoring force to the housing 325 and the cover 327, and accordingly the display device (D) moves in a direction indicated by an arrow (S2).

The guide cam 321 rotates along the screw 210*b* of the screw beam 210 in the arrow (K) direction, and at this time, the guide pin 326 exits the second end groove 346 and moves along the second guide line 336. Then, the guide pin 326 is located in the first end groove 341 which is the next in order.

As the guide cam 321 rotates in the arrow (K) direction, the winding degree between the guide cam 321 and the screw beam 210 changes, and the clearance between the display device (D) and the wall (W) is adjusted by the changed length.

The operator may simply and easily adjust the clearance between the display device (D) and the wall (W) by repeating this operation several times.

Figure 8:
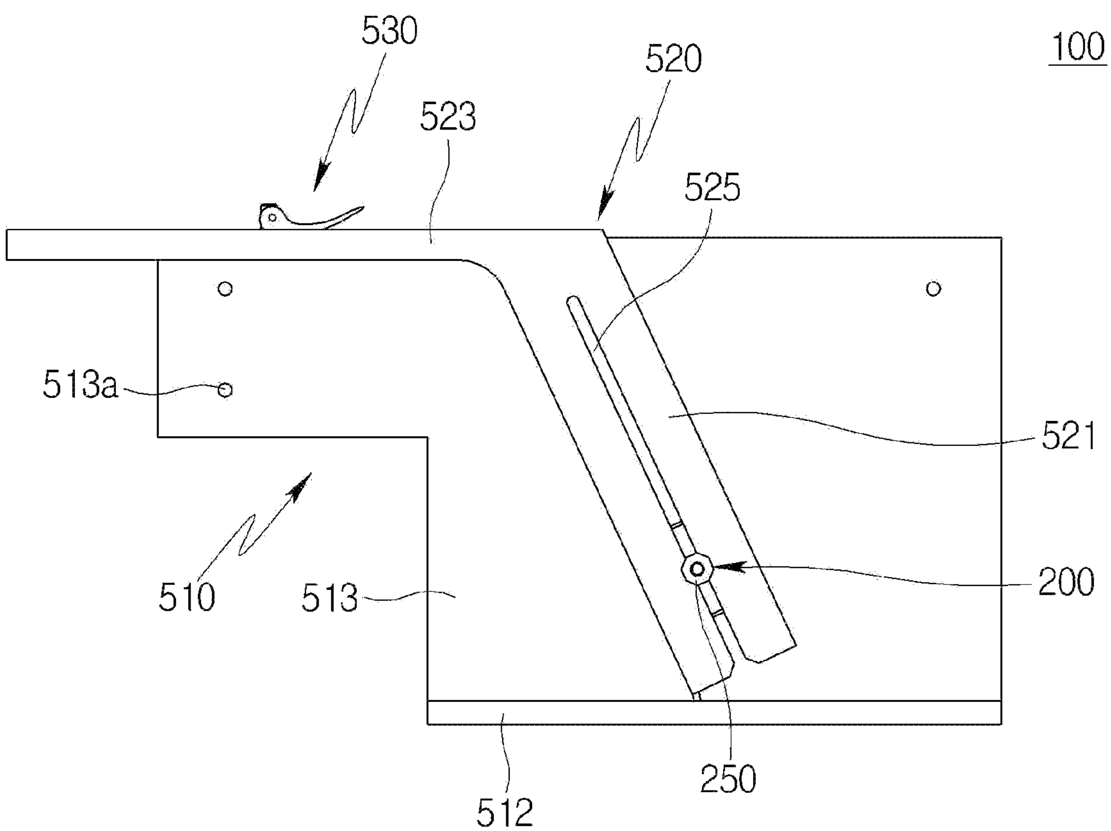
FIG. 8 is a front view showing a fixing apparatus to which the clearance adjustment member disclosed in FIG. 1 is coupled according to one embodiment.
Figure 9:
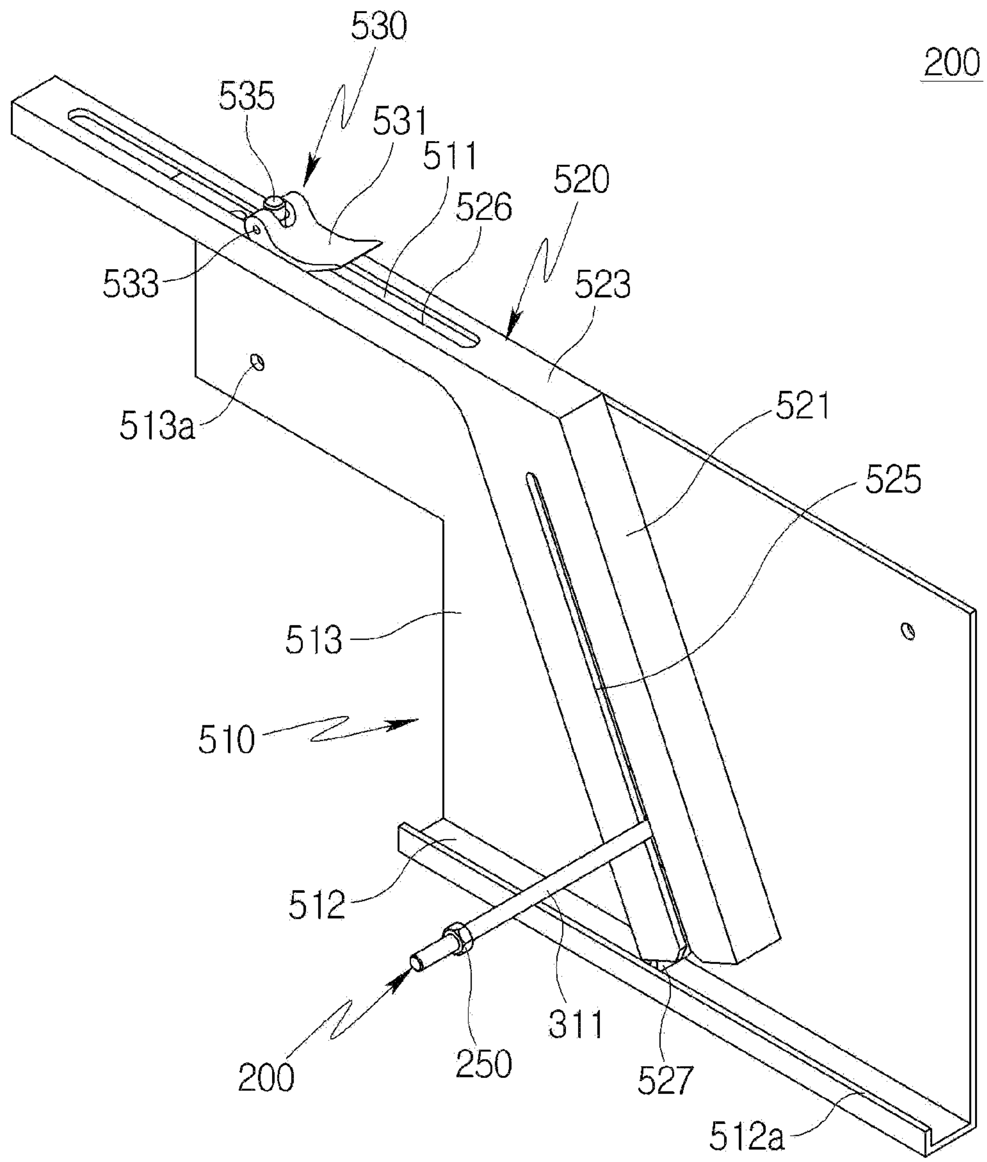
FIG. 9 is a perspective view showing a fixing apparatus to which the clearance adjustment member disclosed in FIG. 1 is coupled according to one embodiment.
Figure 10:
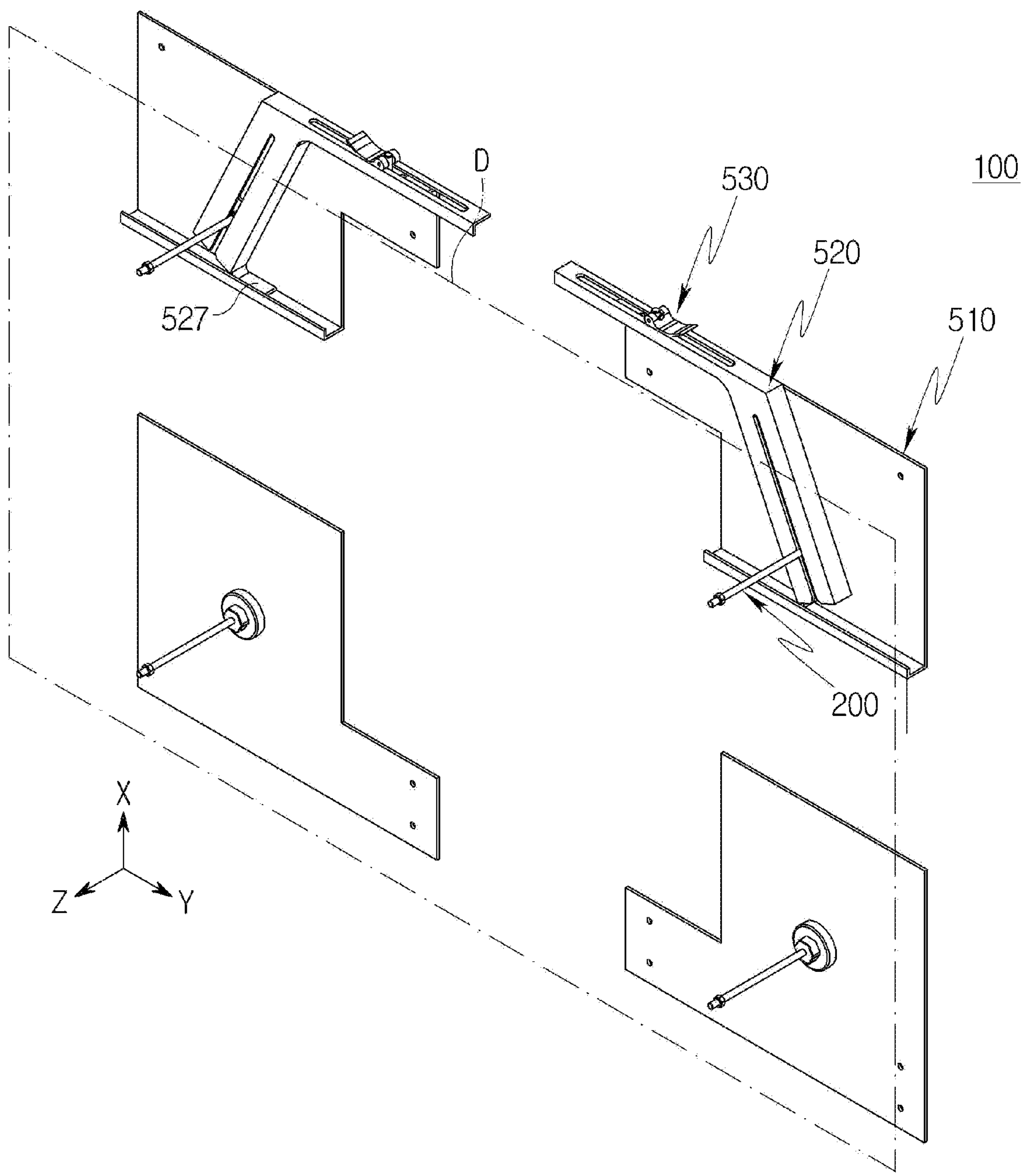
FIG. 10 is a perspective view showing a state in which a display device is fixed to the fixing apparatus to which the clearance adjustment member disclosed in FIG. 1 is coupled according to one embodiment.
Figure 17A:
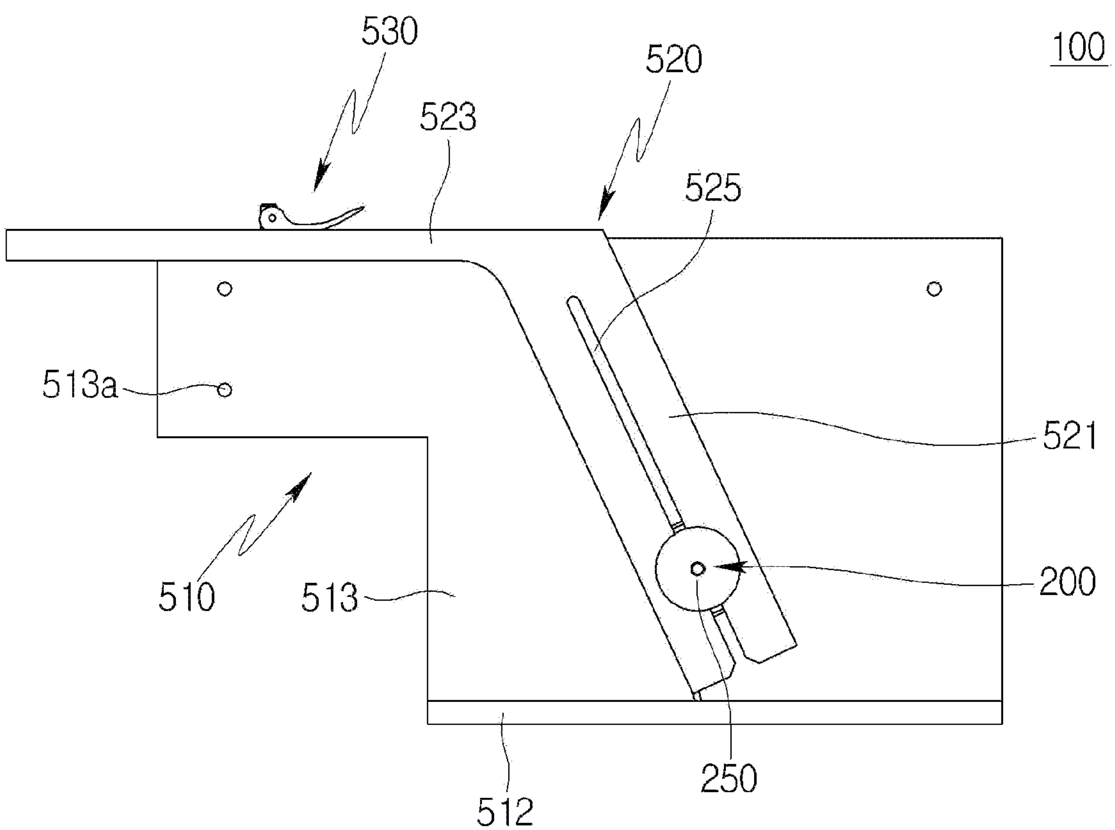
FIG. 17A is a front view showing a fixing apparatus to which the clearance adjustment member disclosed in FIG. 11 is coupled according to one embodiment.
Figure 17B:
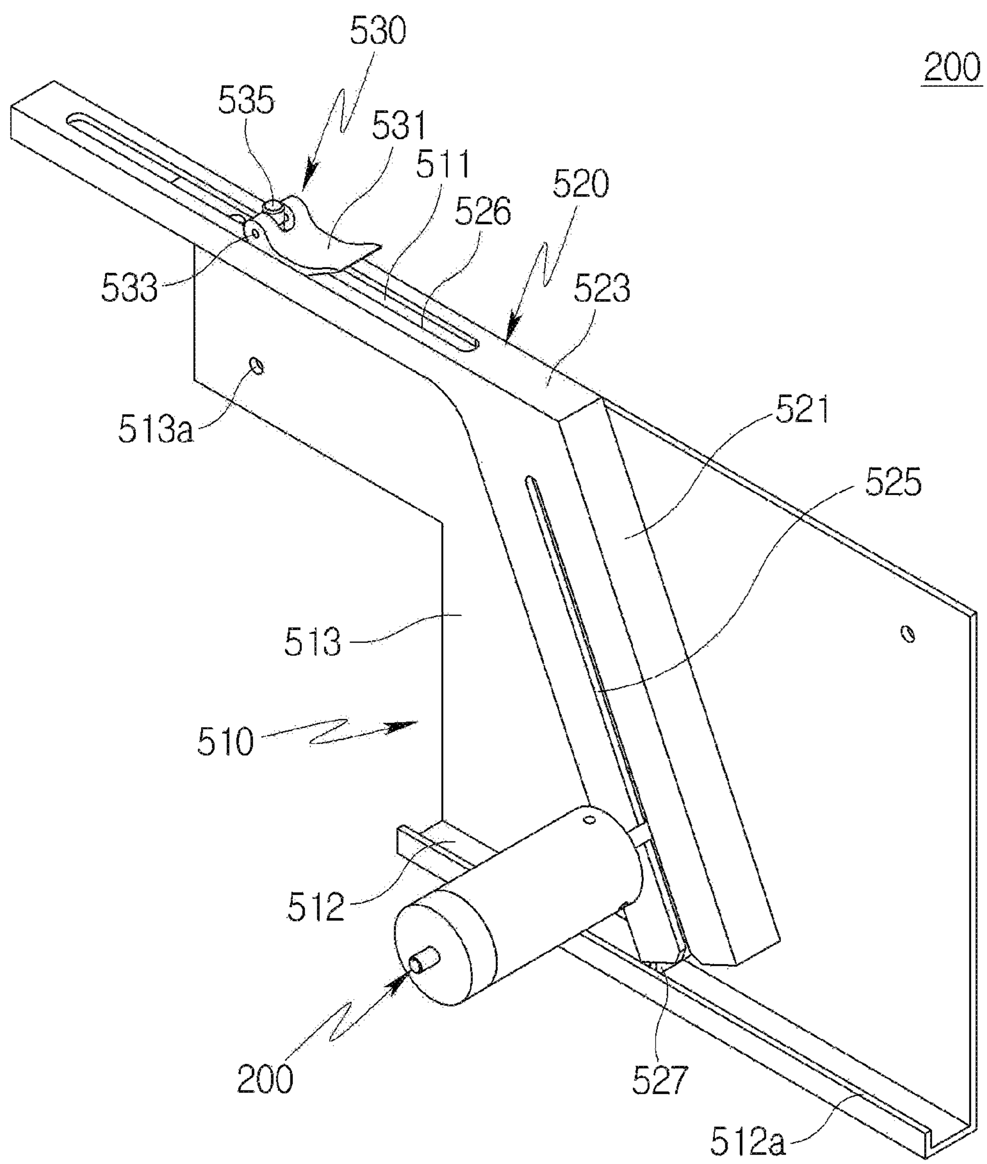
FIG. 17B is a perspective view showing a fixing apparatus to which the clearance adjustment member disclosed in FIG. 11 is coupled according to one embodiment.
Figure 18:
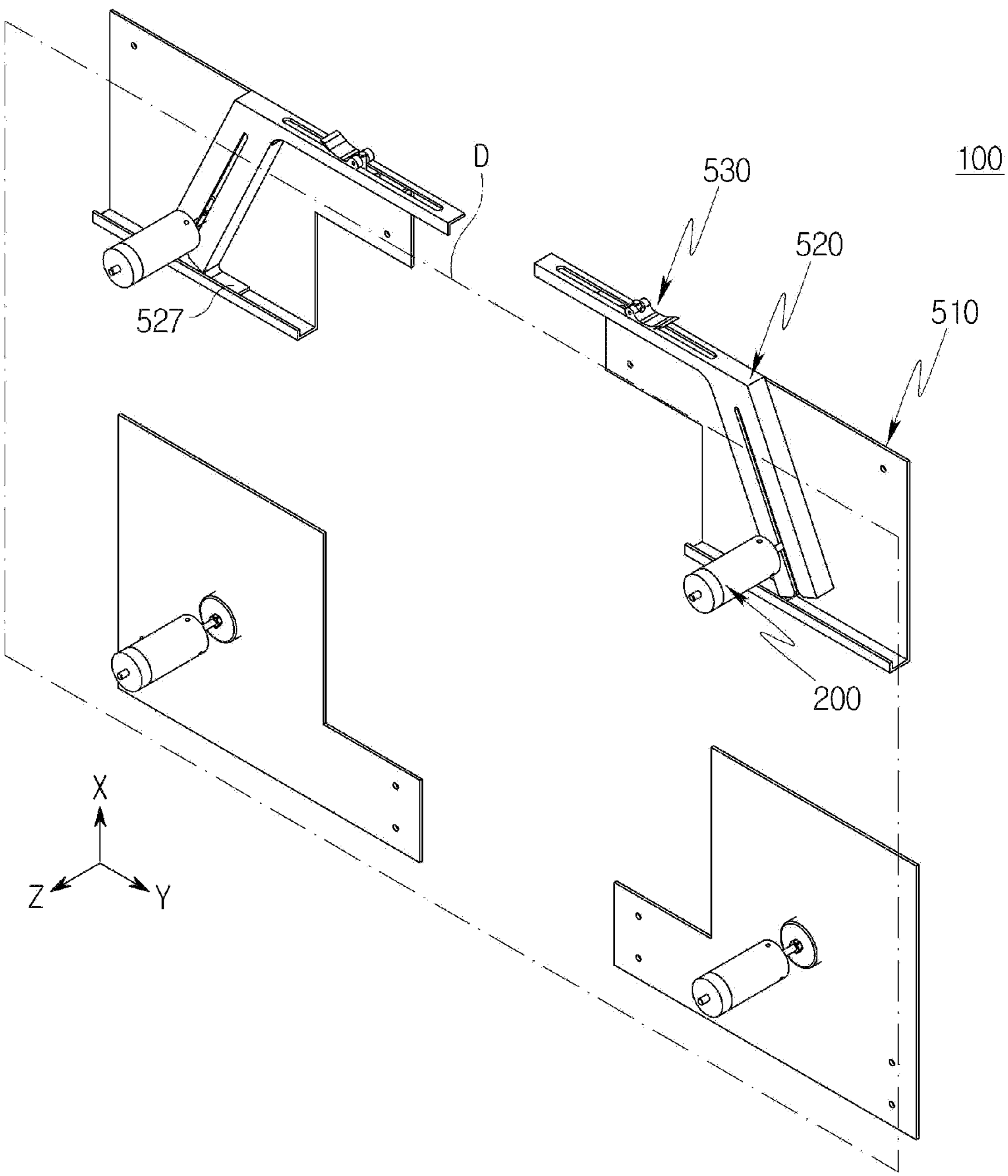
FIG. 18 is a perspective view showing a state in which the display device is fixed to the fixing apparatus to which the clearance adjustment member disclosed in FIG. 11 is coupled according to one embodiment.

On the other hand, the fixing apparatus 100 to which the first embodiment of the clearance adjustment member 200 is applied is disclosed in FIGS. 8 to 10, and the fixing apparatus 100 to which the second embodiment of the clearance adjustment member 200 is applied is shown in FIGS. 17A, 17B and 18.

Further, the operation method of the fixing apparatus 100 according to the present disclosure is shown in FIGS. 19A to 19D.

Before the description, since the fixing apparatus 100 shown in FIGS. 8 to 10 is the same as the fixing apparatus 100 shown in FIGS. 17A, 17B, 18, and 19A to 19D, the description of the fixing apparatus 100 to which the second embodiment of the clearance adjustment member 200 is applied may be equally applied to the fixing apparatus 100 to which the first embodiment of the clearance adjustment member 200 is applied.

Therefore, hereinafter, FIGS. 17A, 17B, 18, and 19A to 19D will be described, which may be applied in the same manner as what are described with respect to FIGS. 8 to 10.

Referring to FIGS. 17*a*, 17*b* and 18, the fixing apparatus 100 according to the present disclosure may include the bracket 510, the clearance adjustment member 200, the fixing bar 520 and the lever member 530.

The bracket 510 may be fastened to the wall (W) by bolts, and may be composed of a material which reacts to magnetic force, including metal materials such as iron, aluminum and the like. The bracket 510 may include a mounting plate 513, a top flange 511 and a bottom flange 512.

A plurality of fastening holes 513*a* may be formed in the mounting plate 513, and fasteners such as bolts and nails may be coupled to the fastening holes 513*a* to be fixed to the wall (W).

The top flange 511 may have a plate shape, and may be disposed to be connected to a top end of the mounting plate 513, and the bottom flange 512 may have a plate shape, and may be disposed to be connected to a bottom end of the mounting plate 513. Here, the top flange 511 and the bottom flange 512 may be disposed parallel to each other.

The clearance adjustment member 200 is attached to the bracket 510 and may adjust the clearance between the wall (W) and the display device (D). As described above, the clearance adjustment member 200 includes a magnetic force unit 220, and the magnetic force unit 220 may be attached to the bracket 510.

For the method in which the clearance adjustment member 200 adjusts the clearance between the wall (W) and the display device (D), refer to the above description.

The fixing bar 520 may be connected to the clearance adjustment member 200 and coupled to the bracket 510 to fix the position of the clearance adjustment member 200 to the bracket 510. In addition, the fixing bar 520 is coupled to the bracket 510 and may additionally support a display device in addition to the magnetic force unit 220. The fixing bar 520 may include a body plate 521, a first plate 523, and a second plate 527.

The body plate 521 may have a curved U-shape at both sides, and a first inserting groove 525 through which the clearance adjustment member 200 passes may be formed.

Figure 19A:
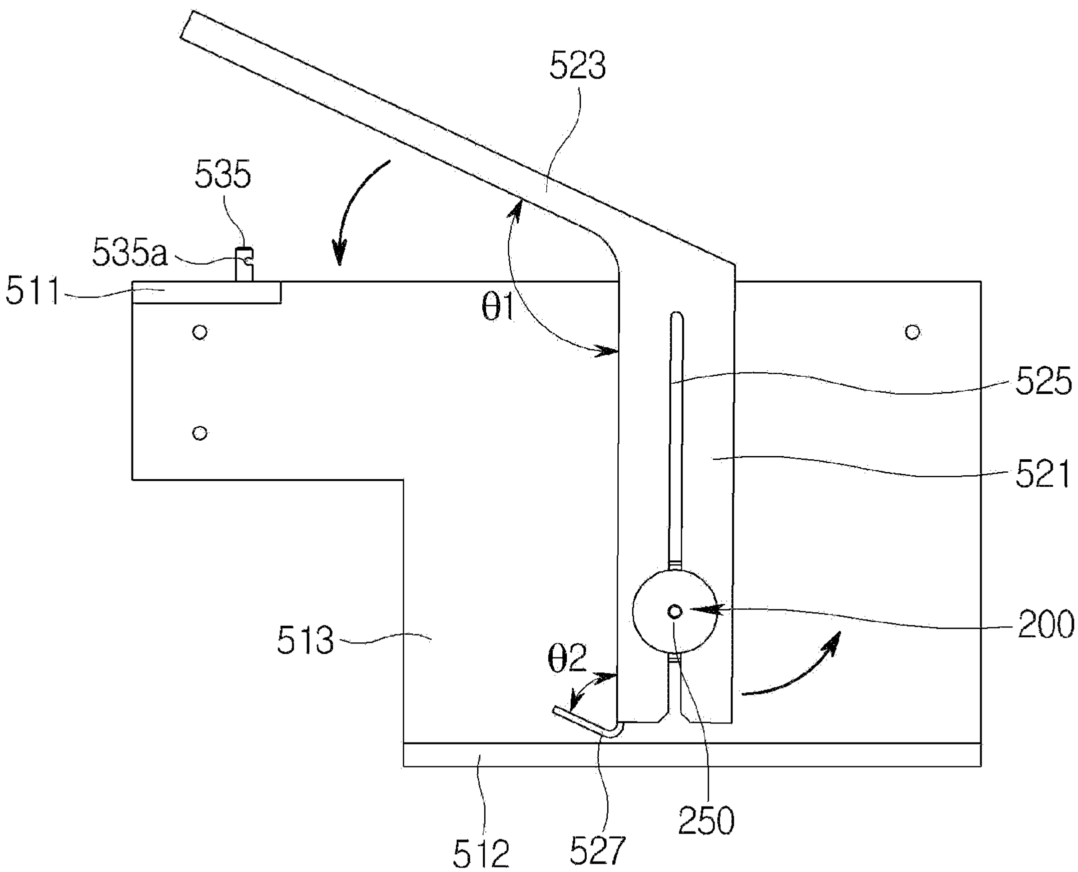
FIGS. 19A to 19D are views showing an operation method in which a fixing bar and a bracket are coupled in the fixing apparatus according to one embodiment.
Figure 19B:
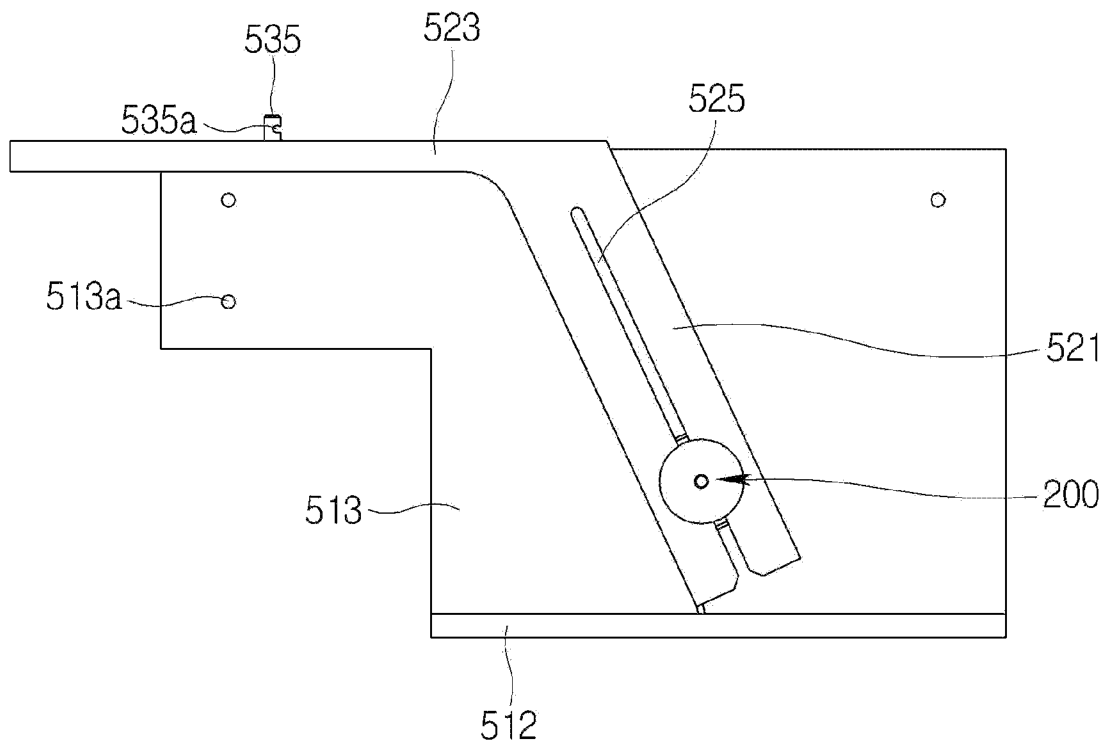

The first plate 523 may be connected to a top end of the body plate 521 by being inclined at a first angle (01). Referring to FIGS. 19A and 19B, the first angle (01) may be an angle at which the first plate 523 is contacted and seated in parallel with the top flange 511 when the body plate 521 rotates. In addition, a second inserting groove 526 into which the projecting pin 535 of the lever member 530 is inserted may be formed in the first plate 523.

The second plate 527 may be connected to a lower end of the body plate 521 by being inclined at a second angle (02). Referring to FIGS. 19A and 19B, the second angle (02) may be an angle at which the second plate 527 is contacted and seated in parallel with the bottom flange 512 when the body plate 521 rotates.

If the top flange 511 and the bottom flange 512 are parallel to each other, the first angle ($\theta 1$) and the second angle ($\theta 2$) may be $\theta 1 = 180° - \theta$2. In this case, when the fixing bar 520 rotates, the first support plate 523 and the second support plate 527 may be seated on the top flange 511 and the bottom flange 512, respectively.

Accordingly, as shown in FIGS. 19A and 19B, when the body plate 521 rotates, the first plate 523 is seated on the top flange 511 and is fixed by the lever member 530, and the second plate 527 may be seated on the bottom flange 512.

As described above, when the fixing bar 520 is seated on the top flange 511 and the bottom flange 512, thereby the display device (D) connected to the clearance adjustment member 200 may be supported. That is, it becomes possible to prevent the display device (D) from descending downward due to the weight of the display device (D).

In addition, since an upwardly curved extension portion 512*a* is formed at an end of the bottom flange 512, when the second plate 527 is seated on an inner bottom surface of the bottom flange 512, the second plate 527 is supported by the mounting plate 513 and the extension portion 512*a* of the bottom flange 512, thereby preventing deviation in the Z direction.

Next, the lever member 530 may fix the fixing bar 520 to the bracket 510. The lever member 530 may include a projecting pin 535 and a lever handle 531.

The projecting pin 535 is disposed on the top flange 511 and a pin groove 535*a* may be formed on one side thereof. In addition, the projecting pin 535 may be disposed to pass through the first inserting groove 525 when the first plate 523 is seated on the top flange 511.

The lever handle 531 may be connected to the pin groove 535*a* and the lever pin 533.

Figure 19C:
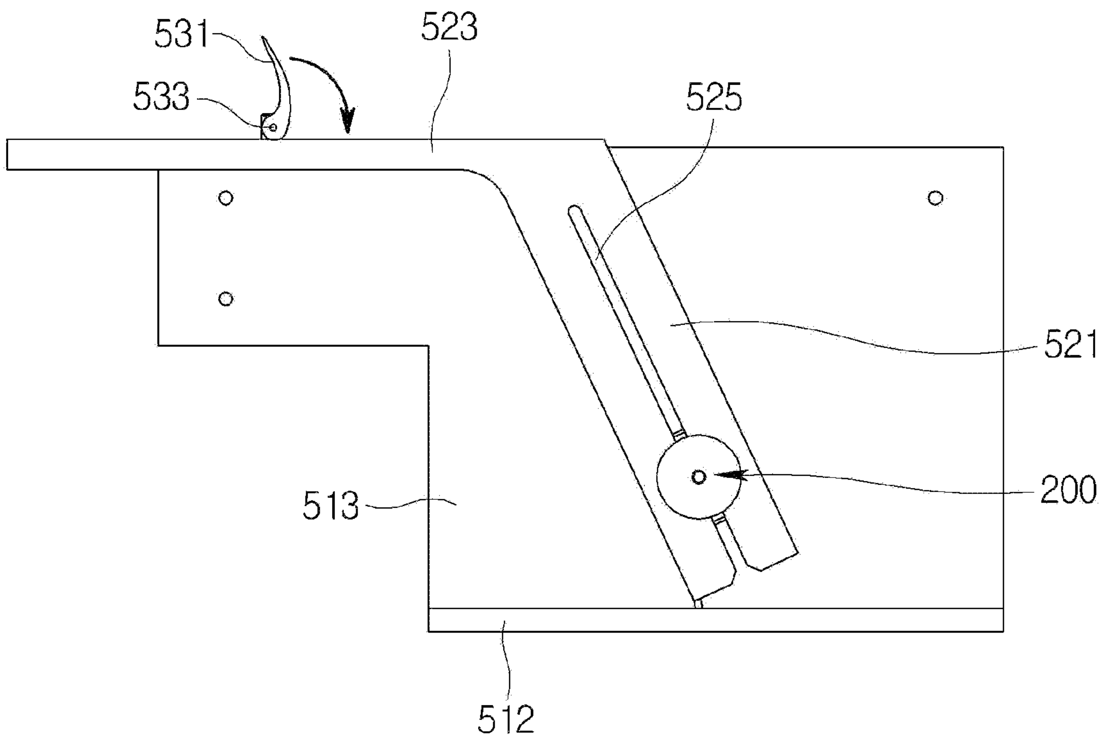
Figure 19D:
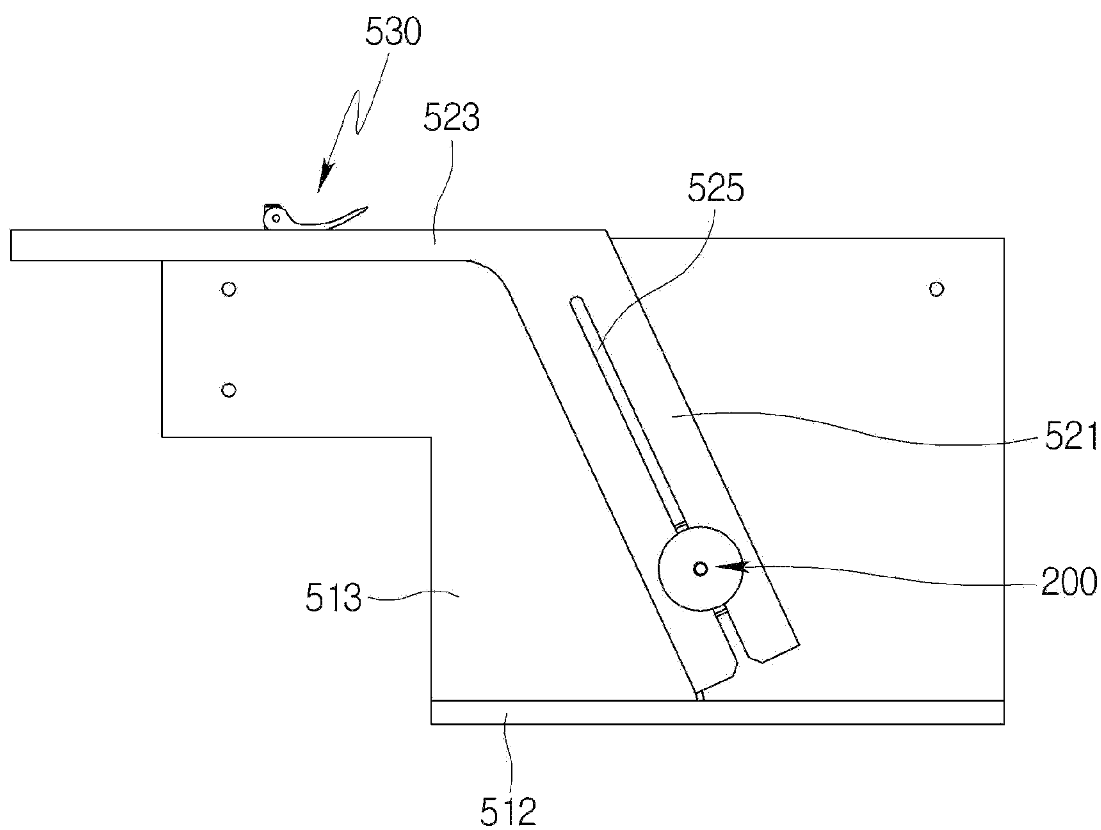

As shown in FIGS. 19C and 19D, when an operator holds and turns the lever handle 531, it is possible to press and fix the first plate 523 to the top flange 511.

The operating principle of the lever member 530 may be similar to a QR lever (quick release lever), but is not limited thereto.

The structure of the fixing apparatus 100 according to the present disclosure is the same as described above, and an operation method of the fixing apparatus 100 will be described below with reference to FIGS. 19A to 19D.

Referring to FIG. 19A, the magnetic force unit 220 of the clearance adjustment member 200 connected to the display device (D) is attached to the mounting plate 513 of the bracket 510 to fix the installation position of the display device (D).

In order to prevent the position of the clearance adjustment member 200 from being changed on the mounting plate 513, it is necessary to fix the attachment position of the clearance adjustment member 200. Accordingly, the fixing bar 520 is coupled to the clearance adjustment member 200.

The first inserting groove 525 is formed in the body plate 521 of the fixing bar 520, and the clearance adjustment member 200 is coupled to the first inserting groove 525.

In the first embodiment of the clearance adjustment member 200, the link beam 311 may be disposed to pass through the first inserting groove 525.

Moreover, in the second embodiment of the clearance adjustment member 200, the screw beam 210 may be disposed to pass through the first inserting groove 525.

The operator lowers the fixing bar 520 downwardly from the upper part of the clearance adjustment member 200 so that the clearance adjustment member 200 is coupled to the inserting groove.

Next, referring to FIG. 19B, the operator rotates the fixing bar 520 so that the first plate 523 of the fixing bar 520 is seated on the top flange 511 of the bracket 510. At this time, the second plate 527 of the fixing bar 520 is seated on the bottom flange 512 of the bracket 510.

At this time, the first inserting groove 525 is also rotated, and moving the clearance adjustment member 200 coupled to the first inserting groove 525 upward, downward, leftward, or rightward is limited.

Referring to FIGS. 10 and 18, four brackets 510 are disposed to fix one display device (D) to a wall (W), and two fixing bars 520 are disposed on two brackets 510 disposed on the upper side, respectively. The lower brackets lack fixing bars 520.

At this time, since the two first inserting grooves 525 respectively formed on the two fixing bars 520 are arranged in opposite inclination directions, the clearance adjustment member 200 coupled to the two first inserting grooves 525 may not be moved upward or downward (X-axis) and leftward or rightward (Y-axis) directions. That is, since the attachment position of the clearance adjustment member 200 is fixed, the position of the display device (D) connected to the clearance adjustment member 200 is also fixed.

Next, referring to FIG. 19C, the operator couples the lever member 530 in order to fix the fixing bar 520 to the bracket 510.

As described above, the projecting pin 535 is installed on the top flange 511, and when the fixing bar 520 is lowered, the projecting pin 535 is disposed to pass through the second inserting groove 526. Referring to FIGS. 9 and 17B, it is available to see that the projecting pin 535 is disposed to pass through the second inserting groove 526.

The operator connects the lever handle 531 to the projecting pin 535, and at this time, since the lever pin 533 is connected to the lever handle 531, the operator inserts the lever pin 533 into the pin groove 535*a*. Then, the operator holds the lever handle 531 and rotates it.

Next, referring to FIG. 19D, the lever handle 531 is lowered, and the first plate 523 of the fixing bar 520 is compressed against the top flange 511 and fixed.

Finally, the first plate 523 is seated on the top flange 511, the second plate 527 is seated on the bottom flange 512, and the attachment position of the clearance adjustment member 200 is fixed inside the first inserting groove 525, so the display device (D) may be not only simply and easily installed on the wall (W), but also may be stably connected to the wall (W).

Figure 20A:
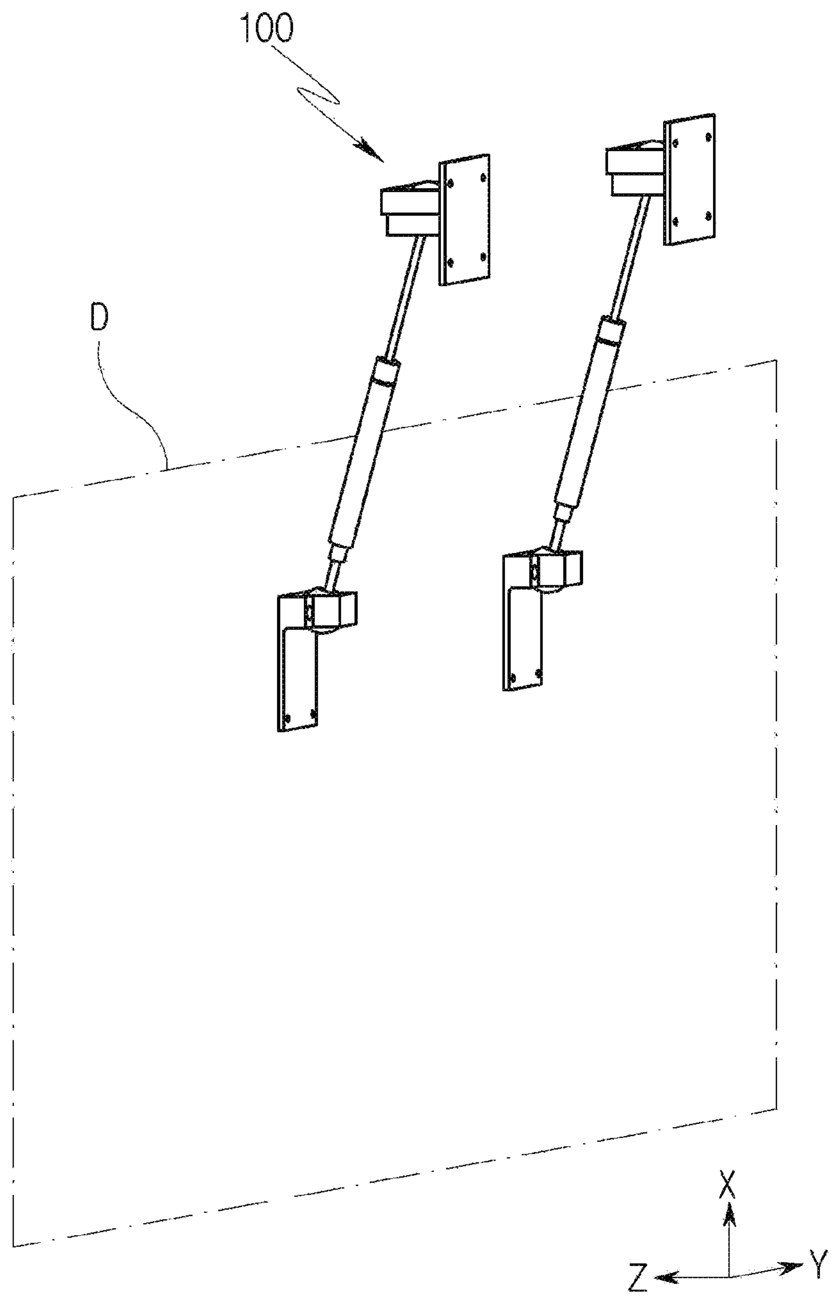
FIG. 20A is a view showing a state in which the fixing apparatus is coupled to the display device according to one embodiment.
Figure 20B:
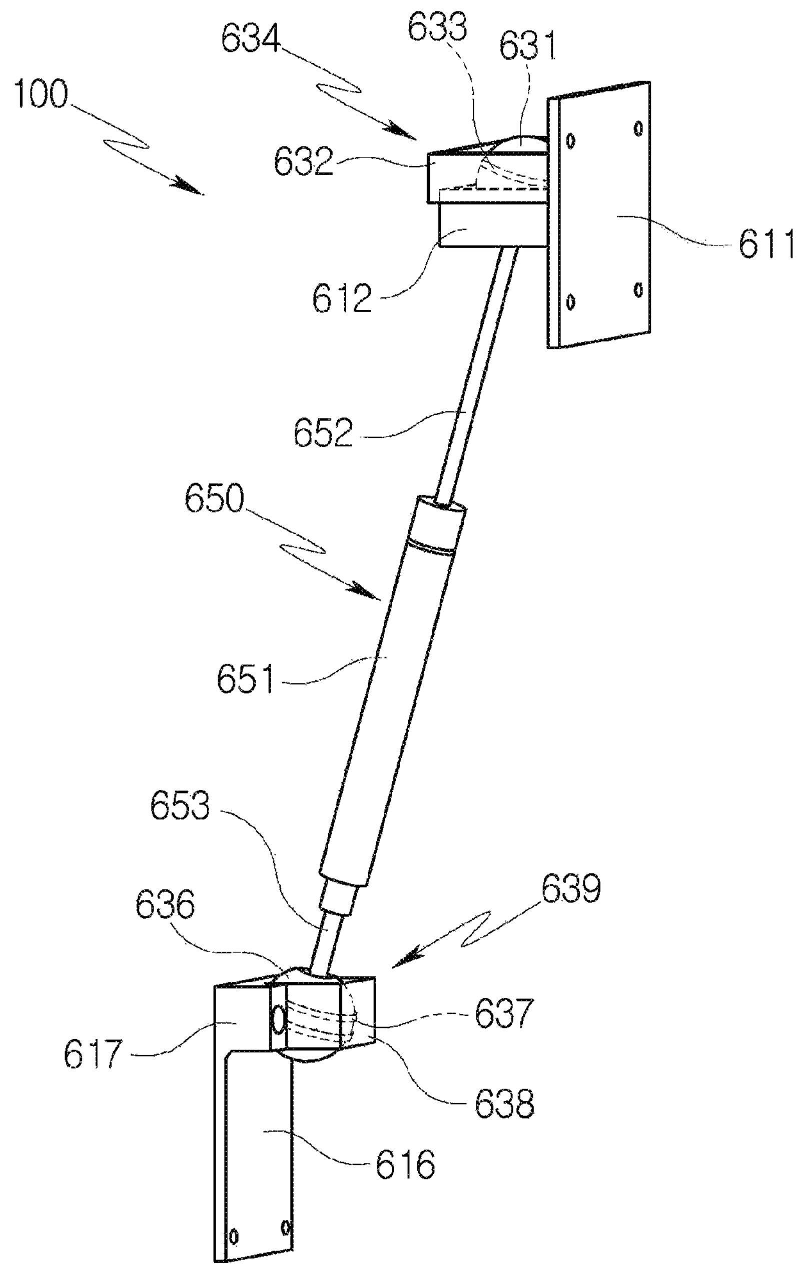
FIG. 20B is a view showing the fixing apparatus according to one embodiment.

Meanwhile, FIG. 20A is a view showing a state in which another embodiment of the fixing apparatus of the present disclosure is coupled to the display device and FIG. 20B is a view showing another embodiment of the fixing apparatus of the present disclosure.

Referring to FIGS. 20A and 20B, another embodiment of the fixing apparatus 100 according to the present disclosure may include a first bracket 611, a second bracket 616, a first ball joint unit 634, a second ball joint unit 639, and a gas damper 650.

The first bracket 611 may be fixed by bolting to the wall to which the display device (D) is to be attached. The first support block 612 may be disposed on one side of the first bracket 611, and the first ball joint unit 634 may be disposed on the first support block 612.

The first ball joint unit 634 may include a first ball housing 632 disposed on the first support block 612 and a first ball 631 disposed inside the first ball housing 632. At this time, in order to increase the friction force of the first ball 631 to fix the position of the fixing apparatus 100, a first sealing 633 may be arranged around the outer circumference of the first ball 631. The first sealing 633 forms frictional resistance with the inner surface of the first ball housing 632, thereby preventing the display device (D) from being loosened in the fixed position.

Next, the second bracket 616 may be fixed by bolting to the display device (D). A second support block 617 may be disposed on one side of the second bracket 616, and a second ball joint unit 639 may be disposed inside the second support block 617.

The second ball joint unit 639 may include a second ball housing 638 disposed inside the second support block 617, and a second ball 636 disposed inside the second ball housing 638. At this time, in order to increase the friction force of the second ball 636 to fix the position of the fixing apparatus 100, a second sealing 637 may be arranged around the outer circumference of the second ball 636. The second sealing 637 forms frictional resistance with the inner surface of the second ball housing 638 and may prevent the display device (D) from being loosened in its fixed position.

In addition, the gas damper 650 may connect the first ball joint unit 634 and the second ball joint unit 639. The gas damper 650 may include a first rod 652 coupled to the first ball 631, a second rod 653 coupled to the second ball 636, and a gas spring type damper cylinder 651 that expands and contracts the first rod 652 and the second rod 653, respectively.

According to the above configuration, the first ball joint unit 634 and the second ball joint unit 639 may fix the display device at a desired position in the X axis and Y axis directions by adjusting the position several times. In addition, by adjusting the clearance between the first ball joint unit 634 and the second ball joint unit 639, the gas damper 650 may adjust the clearance between the wall surface and the display device in the Z-axis direction.

Figure 21A:
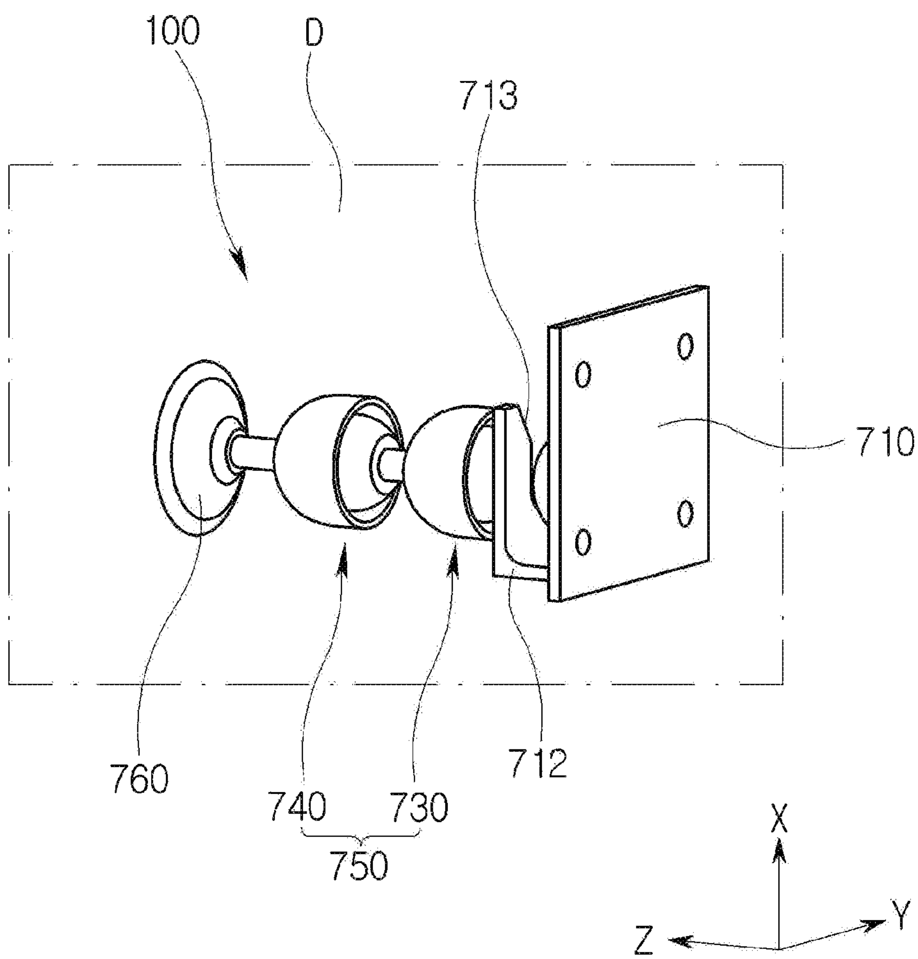
FIG. 21A is a view showing a state in which the fixing apparatus is coupled to the display device according to one embodiment.
Figure 21B:
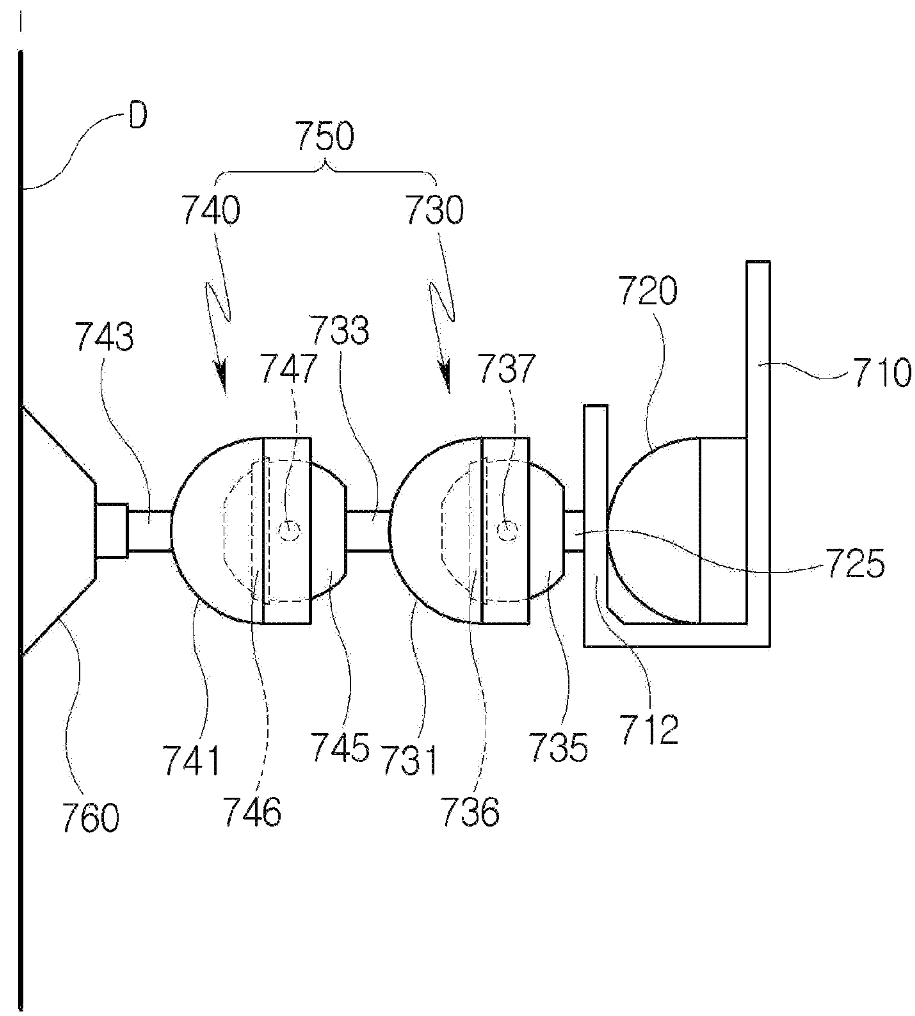
FIG. 21B is a side view of the fixing apparatus disclosed in FIG. 21A according to one embodiment.

Meanwhile, FIG. 21A is a view showing a state in which another embodiment of the fixing apparatus 100 of the present disclosure is coupled to the display device, and FIG. 21B is a side view of the fixing apparatus of the present disclosure disclosed in FIG. 21A.

Referring to FIGS. 21A and 21B, another embodiment of the fixing apparatus 100 according to the present disclosure may include a third bracket 710, a fourth bracket 760, a third ball joint unit 730, a fourth ball joint unit 740, and a fixing unit 720.

The third bracket 710 may be bolted to the wall to be fixed. An L-shaped third support block is connected to one side of the third bracket 710 to form a receiving space, and a fixing unit 720 may be disposed inside the receiving space. The fixing space may be formed in the third support block, and the fixing unit 720 may be connected to the third ball joint unit 730 and a first link beam 725. Further, the first link beam 725 may be inserted into the fixing space, and the fixing unit 720 may be disposed in the receiving space formed by the second support block 617 and the third bracket 710.

The third ball joint unit 730 may be connected to the fixing unit 720 by the first link beam 725, and may be connected to the fourth ball joint unit 740 by a second link beam 733.

The third ball joint unit 730 may include a third ball housing 731 connected to the third ball joint unit 730 and the second link beam 733, and a third ball 735 disposed inside a third ball housing 731. At this time, a third sealing 736 may be arranged around the outer circumference of the third ball 735 to increase the friction force of the third ball 735 so as to fix the position of the fixing apparatus. Moreover, a third ball shaft 737 serving as a center of rotation of the third ball 735 may connect the third ball 735 and the inside of the third ball housing 731.

The third sealing 736 forms frictional resistance with an inner surface of the third ball housing 731, thereby preventing the display device from being from being loosened in the fixed position.

Further, the fourth ball joint unit 740 may include a fourth ball housing 741 connected to the fourth bracket 760 and a third link beam 743, and a fourth ball 745 disposed inside the fourth ball housing 741. In this case, a fourth sealing 746 may be disposed around the outer circumference of the fourth ball 745 in order to increase the friction force of the fourth ball 745 to fix the position of the fixing apparatus. In addition, a fourth ball shaft 747 serving as a center of rotation of the fourth ball 745 may connect the fourth ball 745 to an inside of the fourth ball housing 741.

The fourth sealing 746 may form frictional resistance with the inner surface of the fourth ball housing 741, thereby preventing the display device from being loosened in the fixed position.

The fourth bracket 760 may be formed on a display device, and as the third link beam 743 is coupled to the fourth bracket 760, it becomes possible to connect the third ball joint unit 730, the fourth ball joint unit 740, and the fixing unit 720 to the display device (D).

Through the above structure, multi-joint motion between the third ball joint unit 730 and the fourth ball joint unit 740 enables motion in multiple directions with regard to the X, Y, and Z axes so that the display device (D) can be fixed at the position desired by the user.

The above is merely showing a specific embodiment of the clearance adjustment member and the fixing apparatus including the same.

Therefore, it should be noted that those skilled in the art may easily understand that the present disclosure may be substituted and modified in various forms in the scope that does not depart from the sense of the present invention specified in the claims below.

| REFERENCE NUMERALS | |
|---|---|
| 100: FIXING APPARATUS | |
| 200: CLEARANCE ADJUSTMENT MEMBER | 210: SCREW BEAM |
| 220: MAGNETIC FORCE UNIT | 230: WASHER |
| 250: SUPPORT BLOCK | 260: NUT |
| 300: ADJUSTMENT UNIT | 311: LINK BEAM |
| 313: ADJUSTING BLOCK | 315: LINK PLATE |
| 321: GUIDE CAM | 325: HOUSING |
| 326: GUIDE PIN | 328: ELASTIC BODY |
| 330: GUIDE LINE | 331: FIRST GUIDE LINE |
| 332: FIRST BOUNDARY PORTION | |
| 333: SECOND BOUNDARY PORTION | |
| 336: SECOND GUIDE LINE | 341: FIRST END GROOVE |
| 346: SECOND END GROOVE | |
| 510: BRACKET | 511: TOP FLANGE |
| 512: BOTTOM FLANGE | 513: AMOUNTING PLATE |
| 520: FIXING BAR | 523: FIRST SUPPORT PLATE |
| 525: FIRST INSERTING GROOVE | 526: SECOND INSERTING GROOVE |
| 527: SECOND SUPPORT PLATE | 530: LEVER MEMBER |
| 531: LEVER HANDLE | 533: LEVER PIN |
| 535: PROJECTING PIN | 535A: PIN GROOVE |
| 611: FIRST BRACKET | 612: FIRST SUPPORT BLOCK |
| 616: SECOND BRACKET | 617: SECOND SUPPORT BLOCK |
| 631: FIRST BALL | 632: FIRST BALL HOUSING |
| 633: FIRST SEALING | 634: FIRST BALL JOINT UNIT |
| 636: SECOND BALL | 637: SECOND SEALING |
| 638: SECOND BALL HOUSING | 639: SECOND BALL JOINT UNIT |
| 650: GAS DAMPER | 651: DAMPER CYLINDER |
| 652: FIRST ROD | 653: SECOND ROD |
| 710: THIRD BRACKET | 712: THIRD SUPPORT BLOCK |
| 720: FIXING UNIT | 725: FIRST LINK BEAM |
| 730: THIRD BALL JOINT UNIT | 731: THIRD BALL HOUSING |
| 733: SECOND LINK BEAM | 735: THIRD BALL |
| 736: THIRD SEALING | 737: THIRD BALL SHAFT |
| 740: FOURTH BALL JOINT UNIT | 741: FOURTH BALL HOUSING |
| 743: THIRD LINK BEAM | 745: FOURTH BALL |
| 746: FOURTH SEALING | 747: FOURTH BALL SHAFT |
| 760: FOURTH BRACKET | |
| Z1: FIRST DIRECTION | Z2: SECOND DIRECTION |

-continued

| REFERENCE NUMERALS | |
|---|---|
| P1: FIRST EXTENDING LINE | P2: SECOND EXTENDING LINE |
| P3: THIRD EXTENDING LINE | P4: FOURTH EXTENDING LINE |

What is claimed is:

1. A clearance adjustment member comprising:

a magnetic force unit including a through hole, the magnetic force unit configured to be attached to a bracket that is mounted on a wall;

a screw beam disposed in the through hole of the magnetic force unit; and an adjustment unit connected to the screw beam, the adjustment unit configured to move along the screw beam to adjust a clearance between the wall and a display device that is to be connected to the adjustment unit, wherein the adjustment unit comprises:

a housing including a first end and a second end, first end of the housing including a beam hole through which the screw beam passes and the second end of the housing includes a hole that is larger than the beam hole;

a cover including a first end and a second end, the first end of the cover configured to connect to the display device and the second end of the cover inserted into the hole at the second end of the housing;

a guide cam disposed inside the housing, the guide cam including a screw groove that is connected to the screw beam; and wherein the clearance between the wall and the display device is adjusted responsive to the guide cam rotating in a first direction or a second direction as the screw groove rotates along the screw beam.

2. The clearance adjustment member according to claim 1, wherein the adjustment unit further comprises:

an elastic body disposed inside the housing, the elastic body between the guide cam and the cover.

3. The clearance adjustment member according to claim 2, wherein the guide cam includes a guide line formed around an outer circumference of the guide cam, and the adjustment unit further comprising:

a guide pin inserted into the guide line of the guide cam, wherein the guide line is guided by the guide pin responsive to the guide cam rotating in the first direction or the second direction inside the housing.

4. The clearance adjustment member according to claim 3, wherein the guide line comprises:

a first guide line configured to move along the guide pin such that the guide cam rotates in the first direction that compresses the elastic body;

a second guide line configured to move along the guide pin such that the guide cam rotates in the second direction that extends the elastic body, wherein the first guide line and the second guide line are connected to each other and are alternately disposed along the outer circumference of the guide cam.

5. The clearance adjustment member according to claim 4, wherein a total distance that the screw groove moves along the screw beam is based on a total number of times that the first guide line and the second guide line are connected to each other and alternately disposed around the outer circumference of the guide cam.

6. The clearance adjustment member according to claim 4, wherein the adjustment unit comprises:

a first end groove disposed adjacent to a first surface of the guide cam, a first end of the first guide line and a first end of the second guide line connected to each other at the first end groove; and a second end groove disposed adjacent to a second surface of the guide cam that is opposite the first surface, a second end of the first guide line and a second end of the second guide line connected to each other at the second end groove.

7. The clearance adjustment member according to claim 6, wherein the first end groove comprises:

a first groove surface portion at a first side of the first end groove, the first groove surface portion connected to the first end of the first guide line; and a second groove surface portion at a second side of the first end groove, the second groove surface portion connected to the first end of the second guide line, wherein a length of the first groove surface portion and a length of the second groove surface portion are different.

8. The clearance adjustment member according to claim 7, wherein the length of the first groove surface portion is longer than the length of the second groove surface portion.

9. The clearance adjustment member according to claim 8, wherein the guide cam further comprises:

a first boundary portion where the second guide line contacts the first guide line, wherein the first boundary portion is collinear with a first extending line that extends from the second groove surface portion or the first boundary portion is disposed towards a rotation direction of the guide cam with respect to the first extending line such that backward movement of the guide pin is prevented in that the guide pin that is moved towards an inside of the first end groove does not move toward the second guide line during rotation of the guide cam.

10. The clearance adjustment member according to claim 9, wherein a second extending line that passes through a centerline of the first end groove is disposed more towards an opposite direction to a rotation direction of the guide cam with respect to the first extending line to make the guide pin moved towards the inside of the first end groove move towards the first guide line as the guide cam rotates.

11. The clearance adjustment member according to claim 10, wherein the second end groove comprises;

a first groove surface portion connected to the second end of the first guide line; and a second groove surface portion connected to the second end of the second guide line, wherein a length of the first groove surface portion of the second end groove and a length of the second groove surface portion of the second guide line are different.

12. The clearance adjustment member according to claim 11, wherein the length of the second groove surface portion of the second end groove is longer than the length of the first groove surface portion of the second end groove.

13. The clearance adjustment member according to claim 11, wherein the guide cam further comprises:

a second boundary portion where the second guide line and the first guide line are in contact with each other, and wherein the second boundary portion is collinear with a third extending line that extends from the first groove surface portion of the second end groove or the second boundary portion is disposed towards the rotation direction of the guide cam with respect to the third extending line such that backward movement of the guide pin is prevented in that the guide pin that is moved towards the inside of the second end groove does not move toward the first guide line during rotation of the guide cam.

14. The clearance adjustment member according to claim 13, wherein a fourth extending line that passes through a centerline of the second end groove is disposed more towards an opposite direction to the rotation direction of the guide cam with respect to the third extending line to make the guide pin moved towards the inside of the second end groove move towards the second guide line as the guide cam rotates.

15. A fixing apparatus comprising:

a bracket configured to be attached to a wall;

a clearance adjustment member configured to attach to the bracket and adjust a clearance between the wall and a display device;

a fixing bar configured to connect to the clearance adjustment member and the bracket, the fixing bar configured to secure a position of the clearance adjustment member in the bracket; and a lever member configured to secure the fixing bar to the bracket, wherein the clearance adjustment member comprises:

a magnetic force unit including a through hole, the magnetic force unit configured to be attached to a bracket that is mounted on a wall;

a screw beam disposed in the through hole of the magnetic force unit; and an adjustment unit connected to the screw beam, the adjustment unit configured to move along the screw beam to adjust a clearance between the wall and a display device that is to be connected to the adjustment unit.

16. The fixing apparatus according to claim 15, wherein the bracket comprises:

a mounting plate configured to be attached to a wall and the clearance adjustment member;

a top flange connected to a first end of the mounting plate; and a bottom flange connected to a second end of the mounting plate that is opposite the first end of the mounting plate.

17. The fixing apparatus according to claim 16, wherein the fixing bar comprises:

a body plate including a first inserting groove through which the clearance adjustment member passes through;

a first support plate inclined at a first angle and connected to a first end of the body plate, the first support plate including a second inserting groove through which the lever member passes through; and a second support plate inclined at a second angle and connected to a second end of the body plate that is opposite the first end of the body plate, wherein the first support plate is seated in the top flange and is fixed by the lever member, and the second support plate is seated in the bottom flange and supports the display device that is connected to the clearance adjustment member.

18. The fixing apparatus according to claim 17, wherein the bottom flange comprises an extension part protruding upwardly, and wherein the second support plate is supported by the mounting plate and the extension part and deviation in a direction between the display device and a wall surface is prevented while the second support plate is seated in the bottom flange.

19. The fixing apparatus according to claim 17, wherein the lever member comprises:

a projecting pin in the top flange and passing through the second inserting groove, the projecting pin including a pin groove at one side of the projecting pin; and a lever handle connected to the pin groove using a lever pin.

20. A clearance adjustment member comprising:

a first magnetic end configured to attach to bracket mounted on a wall;

a second end that is opposite the first magnetic end, the second end configured to attach to a display device; and an adjustment unit between the first magnetic end and the second end, at least a portion of the adjustment unit configured to rotate to adjust a clearance between the display device and the wall, wherein the first magnetic end includes a magnetic force unit and the clearance adjustment member further comprising a screw beam disposed in a through hole of the magnetic force unit, wherein the adjustment unit comprises:

a housing including a first end and a second end, first end of the housing including a beam hole through which the screw beam passes and the second end of the housing includes a hole that is larger than the beam hole;

a cover including a first end and a second end, the first end of the cover configured to connect to the display device and the second end of the cover inserted into the hole at the second end of the housing;

a guide cam disposed inside the housing, the guide cam including a screw groove that is connected to the screw beam; and wherein the clearance between the wall and the display device is adjusted responsive to the guide cam rotating in a first direction or a second direction as the screw groove rotates along the screw beam.

* * * * *